United States Patent
Shauh et al.

(10) Patent No.: US 9,999,024 B2
(45) Date of Patent: Jun. 12, 2018

(54) EVOLVED MULTIMEDIA BROADCAST MULTICAST SERVICE (EMBMS) STREAMING LOSS CONTROL IN A RADIO SHARING CONCURRENT RADIO ACCESS TECHNOLOGY (RAT) CAPABLE MOBILE DEVICE

(71) Applicant: QUALCOMM Incorporated, San Diego, CA (US)

(72) Inventors: Jack Shyh-Hurng Shauh, San Diego, CA (US); Sivaramakrishna Veerepalli, San Diego, CA (US); Shailesh Maheshwari, San Diego, CA (US); Daniel Amerga, San Diego, CA (US); Kuo-Chun Lee, San Diego, CA (US); Mohan Krishna Gowda, San Diego, CA (US); Ralph Akram Gholmieh, San Diego, CA (US); Nagaraju Naik, San Diego, CA (US); Nermeen Ahmed Bassiouny, San Diego, CA (US); Thadi Manjunath Nagaraj, San Diego, CA (US); Amit Mahajan, Santa Clara, CA (US); Reza Shahidi, San Diego, CA (US); Pavan Kaivaram, San Diego, CA (US); Ramchandran Srinivasan, San Diego, CA (US); Alexey Semjonovs, Longmont, CO (US); Adrian Prentice, Carlsbad, CA (US); Marc Azar, San Diego, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 14/807,986

(22) Filed: Jul. 24, 2015

(65) Prior Publication Data

US 2016/0205663 A1 Jul. 14, 2016

Related U.S. Application Data

(60) Provisional application No. 62/101,009, filed on Jan. 8, 2015, provisional application No. 62/164,752, filed on May 21, 2015.

(51) Int. Cl.
*H04W 72/00* (2009.01)
*H04W 76/25* (2018.01)
(Continued)

(52) U.S. Cl.
CPC ......... *H04W 72/005* (2013.01); *H04L 12/189* (2013.01); *H04W 24/02* (2013.01);
(Continued)

(58) Field of Classification Search
None
See application file for complete search history.

(56) References Cited

U.S. PATENT DOCUMENTS 8,761,788 B2 6/2014 Rajurkar et al.
2005/0245253 A1* 11/2005 Khushu ................. G01S 19/24
455/423
(Continued)

OTHER PUBLICATIONS

International Search Report and Written Opinion—PCT/US2015/067665—ISA/EPO—dated Apr. 5, 2016.

*Primary Examiner* — Yaotang Wang
(74) *Attorney, Agent, or Firm* — The Marbury Law Group, PLLC

(57) ABSTRACT

Embodiments include methods implemented by a processor of a mobile communication device for managing tune-aways by a radio frequency resource supporting a first subscription to support a second subscription. The processor may deter-
(Continued)

mine a data loss ratio of the data of a media file that is lost in transmission to the mobile communication device. The processor may compare the data loss ratio of the data to a first data loss ratio threshold and a second data loss ratio threshold, and the processor may block a tune-away event of the radio frequency resource from the first subscription to the second subscription in response to determining that the data loss ratio of the data is greater than the first data loss ratio threshold and less than the second data loss ratio threshold.

44 Claims, 12 Drawing Sheets

(51) Int. Cl.
| | |
|---|---|
| *H04W 76/28* | (2018.01) |
| *H04W 60/00* | (2009.01) |
| *H04W 24/02* | (2009.01) |
| *H04W 72/08* | (2009.01) |
| *H04L 12/18* | (2006.01) |
| *H04W 88/06* | (2009.01) |
| *H04W 72/04* | (2009.01) |
| *H04W 76/04* | (2009.01) |
| *H04W 76/16* | (2018.01) |
| *H04W 76/02* | (2009.01) |

(52) U.S. Cl.
CPC ....... *H04W 60/005* (2013.01); *H04W 72/048* (2013.01); *H04W 72/08* (2013.01); *H04W 76/045* (2013.01); *H04W 76/048* (2013.01); *H04W 76/25* (2018.02); *H04W 76/28* (2018.02); *H04W 88/06* (2013.01); *H04W 76/026* (2013.01); *H04W 76/16* (2018.02)

(56) References Cited

U.S. PATENT DOCUMENTS

| | | | |
|---|---|---|---|
| 2007/0030830 | A1 | 2/2007 | Sagne et al. |
| 2010/0210235 | A1* | 8/2010 | Ulupinar .............. H04B 7/0877 |
| | | | 455/278.1 |
| 2013/0172023 | A1 | 7/2013 | Chan et al. |
| 2013/0201850 | A1 | 8/2013 | Swaminathan et al. |
| 2013/0215846 | A1 | 8/2013 | Yerrabommanahalli et al. |
| 2013/0295920 | A1* | 11/2013 | Viswanadham ...... H04W 36/14 |
| | | | 455/426.1 |
| 2014/0044046 | A1 | 2/2014 | Vangala et al. |
| 2014/0119293 | A1 | 5/2014 | Sikri et al. |
| 2014/0274051 | A1 | 9/2014 | Hsu et al. |
| 2016/0191258 | A1* | 6/2016 | Oyman ................. H04L 12/189 |
| | | | 370/312 |

\* cited by examiner

EVOLVED MULTIMEDIA BROADCAST MULTICAST SERVICE (EMBMS) STREAMING LOSS CONTROL IN A RADIO SHARING CONCURRENT RADIO ACCESS TECHNOLOGY (RAT) CAPABLE MOBILE DEVICE

RELATED APPLICATIONS

This application claims the benefit of priority to U.S. Provisional Application No. 62/101,009 entitled "eMBMS Streaming Loss Control In A Radio Sharing Concurrent RAT Capable Mobile Device" filed Jan. 8, 2015, and to U.S. Provisional Application No. 62/164,752 entitled "Enhancement in Evolved Multimedia Broadcast Multicast Service (eMBMS) Priority in Competing Tune Away" filed May 21, 2105, the entire contents of both of which are hereby incorporated by reference.

BACKGROUND

Mobile communication devices may include one or more Subscriber Identity Module (SIM) cards that provide users with access to multiple separate mobile telephony networks. A mobile communication device that includes one or more SIMs and connects to two or more separate mobile telephony networks using one or more shared radio frequency (RF) resources/radios may be termed a "multi-standby" communication device. An example is a dual-SIM-dual-standby (DSDS) communication device, which includes two SIM cards/subscriptions that are each associated with a separate radio access technology (RAT), and the separate RATs share one RF chain to communicate with two separate mobile telephony networks on behalf of their respective subscriptions. Another example is a single-radio LTE (SR-LTE) communication device, which includes one SIM card/subscription associated with two RATs that share a single shared RF resource to connect to two separate mobile networks on behalf of the one or more subscriptions.

A plurality of RATs on a multi-standby communication device may use one or more shared RF resources to communicate with their respective mobile telephony networks, and only one RAT may use each RF resource to communicate with its mobile network at a time. Even when a RAT is in an "idle-standby" mode, meaning it is not actively communicating with the network, it may still need to periodically receive access to a shared RF resource in order to perform various network operations. For example, an idle RAT may need the shared RF resource at regular intervals to perform idle mode operations, to receive network-paging messages in order to remain connected to the network, etc. on behalf of its subscription. Therefore, it is possible that at a certain times the multiple RATs sharing an RF resource may need to use the RF resource to communicate with their respective mobile networks simultaneously.

In conventional multi-standby communication devices, the RAT actively using an RF resource that is shared with an idle RAT may occasionally be forced to interrupt its RF operations so that the idle RAT may use the shared RF resource to perform its idle-standby mode operations (e.g., paging monitoring, cell reselection, system information monitoring). This process of switching access of the shared RF resource from the active RAT to the idle RAT is sometimes referred to as a "tune-away" or a "tune-away event," as the RF resource must tune away from the frequency bands and/or channels of the active RAT and must tune to frequency bands/channels of the idle RAT. After network communications via the idle RAT (sometimes collectively referred to herein as "tune-away" operations) are complete, the communication device may switch RF resource access back from the idle RAT to the active RAT.

As a result of the tune-away event, data received using the active RAT may be lost or corrupted and thus may be difficult or impossible to decode. Tune-away events thus present a design and operational challenge for multi-standby communication devices and other shared-radio devices.

SUMMARY

The various embodiments include methods that may be implemented on a mobile communication device for managing tune-aways by a radio frequency (RF) resource supporting a first subscription to support a second subscription. Various embodiments may include determining a first data loss ratio threshold for use in determining when a tune away may be blocked. The determined first data loss ratio may be used in a method that includes determining a data loss ratio based on data that is lost in transmission to the mobile communication device via the first subscription, comparing the data loss ratio of the data to the first data loss ratio threshold and a second data loss ratio threshold, and blocking a tune-away of the RF resource from the first subscription to the second subscription in response to determining that the data loss ratio of the data is greater than the first data loss ratio threshold and less than the second data loss ratio threshold. Some embodiments may further include permitting the tune-away in response to determining that the data loss ratio of the data is less than the first data loss ratio threshold. Some embodiments may further include permitting a tune-away in response to determining that the data loss ratio of the data is greater than the second data loss threshold. In some embodiments, determining a data loss ratio based on data that is lost in transmission to the mobile communication device via the first subscription may include determining a data loss ratio of a media file based on data that is lost in transmission to the mobile communication device via the first subscription.

Some embodiments may further include determining the first data loss ratio threshold based on an amount of redundant data of the media file transmitted to the mobile communication device. Some embodiments may further include determining the second data loss ratio threshold based on the first data loss ratio threshold and at least one of a scheduling period for delivering data of the media file to the mobile communication device, a number of streams transmitted by a mobile communication network associated with the first subscription, and an expected duration of the tune-away.

Some embodiments may further include determining whether the tune-away is scheduled for a critical operation of the second subscription, and permitting the tune-away in response to determining that the tune-away event is scheduled for a critical operation of the second subscription and that the data loss ratio of the data is greater than the first data loss ratio threshold and less than the second data loss ratio threshold. In some embodiments, determining a data loss ratio of the data may include determining an amount of object data lost during one or more sampling periods. In such embodiments, the sampling periods may include sliding sampling windows.

Some embodiments may further include determining the second data loss ratio threshold based at least in part on a forward error correction scheme associated with the data and an amount of redundant data of the data transmitted to the mobile communication device, and determining the first data loss ratio threshold based at least in part on the second data loss ratio threshold and an expected data ratio scaled by a data loss ratio factor. Some embodiments may further include determining whether a previous object was successfully received, and reducing the data loss ratio factor until data loss ratio factor minimum value is reached in response to determining that a previous object was successfully received.

Some embodiments may further include setting the data loss ratio factor to a data loss ratio factor maximum value in response to determining that a previous object was not successfully received. Some embodiments may further include determining a failure rate for media file transmissions over an interval of media file transmissions, and determining the data loss ratio factor minimum value based at least in part on the determined failure rate Some embodiments may further include determining whether an error rate of data transmission is greater than an error threshold, and permitting the tune-away in response to determining that the error rate is greater than the error threshold. In such embodiments, the error threshold may be based at least in part on a configurable error coefficient, an amount of redundant data of the data transmitted to the mobile communication device, and a forward error correction scheme associated with the data. In such embodiments, the error rate may be a block error rate (BLER) or average BLER (aBLER).

Further embodiments may include a mobile communication device including a radio frequency resource and a processor coupled to the radio frequency resource and configured with processor-executable instructions to perform operations of the methods described above. Further embodiments may include a mobile communication device including means for performing functions of the methods described above. Further embodiments may include processor-readable storage media on which are stored processor executable instructions configured to cause a processor of a mobile communication device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

Figure 1:
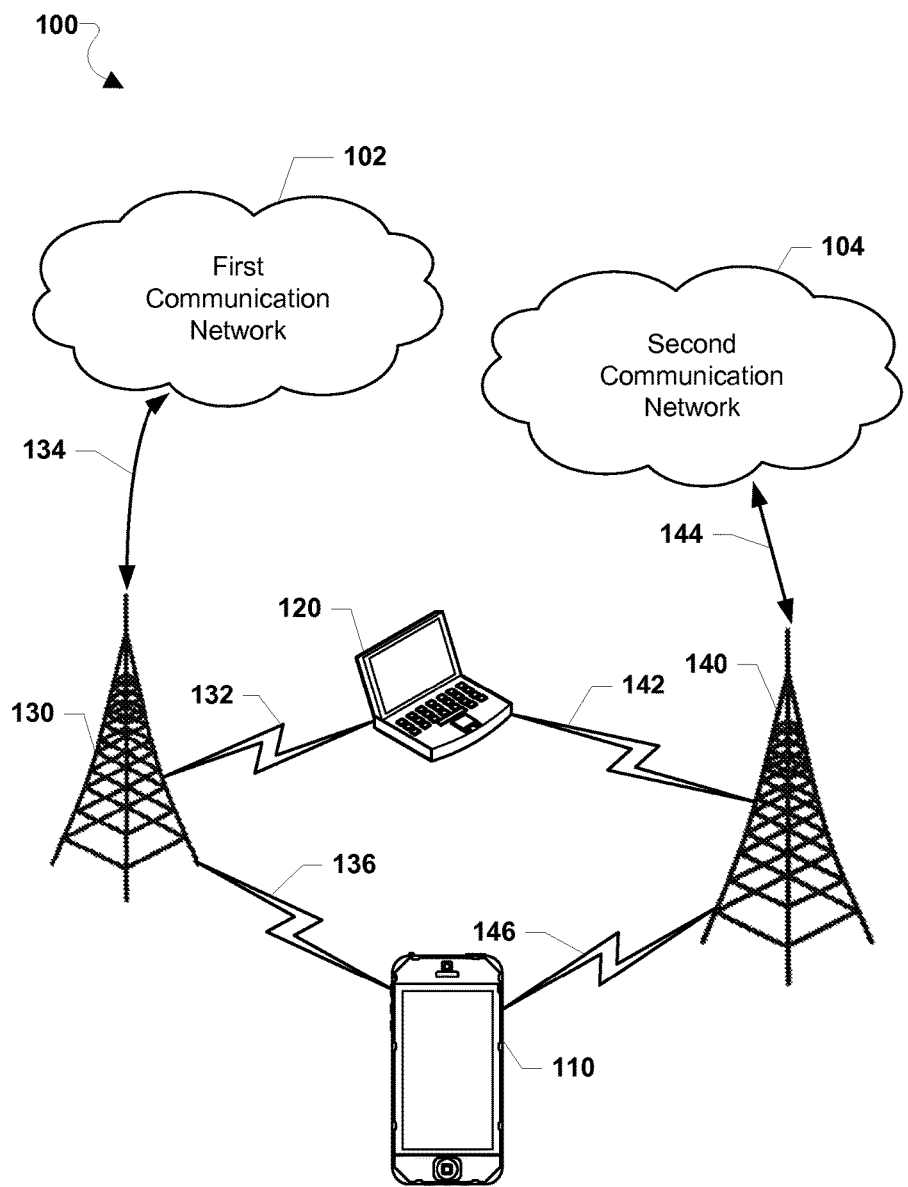
FIG. 1 is a component block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the term "multi-standby communication device" refers to any one or all of cellular telephones, smart phones, personal or mobile multi-media players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain a plurality of RATs that utilize at least one shared RF chain, which may include one or more of antennae, radios, transceivers, etc.

Conventional multi-standby communication devices supporting one or more RATs, including an active (or "first") RAT and an idle (or "second") RAT, may occasionally need to tune away from the first RAT to the second RAT in order to enable the second RAT to perform various tune-away operations. Tune-away operations may include one or more of page monitoring (e.g., discontinuous reception), system information monitoring (e.g., receiving and decoding a broadcast control channel), cell reselection measurements to determine whether to initiate reselection operations to a neighboring cell, updating the second RAT network with the current location of the multi-standby communication device, receiving Short Message Service (SMS) messages, and receiving mobile-terminated calls.

During the tune-away event, communication activities using the first RAT may be interrupted and data may be partially or entirely lost, which may degrade overall reception performance over the first RAT. Tune-away events may be especially disruptive to the first RAT's reception service and performance in situations in which the first RAT is prevented from receiving time-sensitive data, such as when the first RAT receives streaming multimedia (e.g., video and audio data segments) via multi-media broadcast multicast services over LTE, such as the Evolved Multimedia Broadcast Multicast Service (eMBMS).

Currently, a server or content provider operating in the first RAT's network may attempt to mitigate the effects of lost or partially received data by adding redundancy information in the content or data sent to the mobile communication device for the first RAT. This redundancy information enables the mobile communication device to replace missing data and correct partial or corrupted data without requiring the server/content provider to retransmit the lost or incomplete data. For example, the operator may include forward error correction (FEC) data to data packets when broadcasting streaming multimedia data, such as media files. Adding FEC data to data packets enables multi-standby communication devices to recover data for a first RAT that is lost or partially received as a result of tune-away operations using well-known error correction techniques. However, depending on the amount of media data lost or corrupted, a large amount of FEC data may be needed to recover the data loss. A large network overhead associated with FEC data transmission consumes bandwidth otherwise usable for transmitting media data, and is thus undesirable.

The various embodiments provide methods implemented by a processor on a mobile communication device (e.g., a multi-standby communication device) to manage tune-away events performed by the mobile communication device to determine whether to permit or to block a scheduled tune-away event in order to improve to data reception during the tune-away event. The tune-away event is performed periodically at times typically dictated by the RAT. In various embodiments, the mobile communication device may determine whether to permit an impending tune-away event based on an amount of data lost from an expected amount of media data, such as audio, video, or multimedia data.

As used herein the terms "media data" or "media files" refer to data or files that include any form of media, including but not limited to text, audio, video, photographs, and/or audio-video, as well as meta data supporting rendition of such a media data or media files. Media files may be formatted in various ways, including in or as segments, sub-segments, objects, packets, frames, super-frames, and so forth.

As the mobile communication device receives data, the mobile communication device may periodically calculate the data loss ratio of the data from a portion of the media data, such as a File Delivery over Unidirectional Transport (FLUTE) object. Periodically, the mobile communication device may compare the calculated data loss ratio of the data with a first data loss ratio threshold and a second data loss ratio threshold. If the calculated data loss ratio of the data is smaller than or equal to a first data loss ratio threshold, the mobile communication device may permit the tune-away event. Further, if the calculated data loss ratio of the data is larger than a second data loss ratio threshold, the mobile communication device may permit the tune-away event. However, if the calculated data loss ratio of the data is larger than a first data loss ratio threshold and smaller than (or equal to) a second data loss ratio threshold, the mobile communication device may block or disallow the tune-away event to permit the mobile communication device to receive data during the otherwise scheduled tune-away event.

In various embodiments, the second data loss ratio threshold may be determined based on an object size (e.g., an amount of data associated with an object without redundancy), a redundancy level of the object, a factor associated with the FEC coding scheme used for object transmission (e.g., 1.024 for the Raptor10 FEC coding scheme), and/or other suitable factor(s). For example, the second data loss ratio threshold may be determined by multiplying the object size by the result of subtracting a factor associated with the FEC coding scheme reduced by one from a redundancy level of the object.

In various embodiments, the first data loss ratio threshold may be determined based on the second data loss ratio threshold and an expected data loss scaled by a data loss ratio factor. The expected data loss may be a data loss of a next burst assuming the whole burst may be lost. A data loss ratio factor may be a default value or a dynamically determined value. The data loss ratio factor may be any value, such as a value ranging from 0 to 1, greater than 1, etc. A data loss ratio factor of 1 may be an aggressive data loss ratio factor selected to make blocking of tune away more likely. A data loss ratio factor smaller than 1 may be a less aggressive data loss ratio factor selected to favor tune away. In various embodiments, a data loss ratio factor may be initially set to a data loss ratio factor maximum value, such as at the start of a service. For example, the data loss ratio factor maximum value may be 1.

Object success or failure may be signaled by a service layer to a modem layer, such as a Dynamic Adaptive Streaming Over HTTP (DASH) application signaling success or failure of receiving requested segments to a modem layer, or the modem layer may monitor the data loss for a current object to determine whether the requested object was successfully received. In various embodiments, as objects are successfully received, the data loss ratio factor may be updated to reduce the data loss ratio factor until the data loss ratio factor is equal to a data loss ratio factor minimum value. For example, when an object is successfully received, the data loss ratio factor may be reduced by the result of multiplying a configurable delta value by the difference between the data loss ratio factor maximum value and the data loss ratio factor minimum value until the data loss ratio factor minimum value is reached. As a specific example, the data loss ratio factor minimum value may be 0.4. The configurable delta value may be a value selected to be proportional to a target video segment loss rate. For example, to achieve a one percent video segment loss rate, the configurable delta value may be set to 0.01. When an object is not successfully received (e.g., object failure is indicated by the service layer or identified by the modem layer), the data loss ratio factor may be updated (or reset) to equal the data loss ratio factor maximum value.

In various embodiments, the data loss ratio minimum value may be updated based at least in part on an object failure rate over an interval. For example, the status of success or failure for object requests over an interval of a pre-set number of objects (e.g., a data loss ratio minimum value update interval) may be tracked by a failure counter. The object failure rate may be determined as the failure counter value at the end of the interval over the number of objects in the interval. The difference in the object failure rate and an object loss target may be used to determine an update ratio. The data loss ratio factor minimum value may be increased by a step change value when the update ratio is greater than 1 or may be increased by the result of multiplying the step change value by the update ratio when the update ratio is less than 1.

In various embodiments, the mobile communication device may determine a metric of lost data, for example, the metric may include a ratio of lost data to expected data. In various embodiments, the mobile communication device may calculate a data loss ratio of the data periodically, such as based on an object or segment (referred to herein as an "object" for conciseness).

In some embodiments, the first data loss ratio threshold may be based on an amount (such as a percentage) of FEC data scheduled for delivery to the mobile communication device. In some embodiments, the second data loss ratio threshold may be based on the amount of FEC data scheduled for delivery to the mobile communication device as well as a scheduled data reception period, a number of services delivered to the mobile communication device, and a duration of the tune-away event. The various embodiments may calculate the data loss ratio of the data during one or more sampling periods during each object. The frequency of such sampling periods may be shortened to provide more frequent, and thus a more granular determinations of the data loss ratio of the data during each object.

In various embodiments, an error rate in data transmission, such as a block error rate (BLER) or average BLER (aBLER), may be compared to an error threshold. As such, when the error rate in data transmissions is greater than the error threshold, the mobile communication device may permit a tune-away event. The error threshold may be determined by multiplying a configurable error coefficient (e.g., a value ranging from 0 to 1) by the result of 1 minus a redundancy level of the object divided by 1 plus a factor associated with the FEC coding scheme.

Various embodiments may be implemented within a variety of communication systems 100, such as systems that include at least two mobile communication networks, an example of which is illustrated in FIG. 1. A first communication network 102 and a second communication network 104 each may include a plurality of cellular base stations (e.g., a first base station 130 and a second base station 140).

A first mobile communication device 110 may communicate with the first communication network 102 through a communication link 132 to the first base station 130. The first mobile communication device 110 may also communicate with the second mobile network 104 through a communication link 142 to the second base station 140. The first base station 130 may communicate with the first communication network 102 over a wired or wireless communication link 134, and the second base station 140 may communicate with the second communication network 104 over a wired or wireless communication link 144. The communication links 134 and 144 may include fiber optic backhaul links, microwave backhaul links, and other similar communication links. A second mobile communication device 120 may communicate with the first communication network 102 through a communication link 136 to the first base station 130 and with the second communication network 104 through a communication link 146 to the second base station 140.

Each of the communication networks 102 and 104 may support communications using one or more radio access technologies, and each of the communication links 132, 136, 142, and 146 may include cellular connections that may be made through two-way wireless communication links using one or more RATs. Examples of RATs may include 3GPP Long Term Evolution (LTE), Worldwide Interoperability for Microwave Access (WiMAX), Code Division Multiple Access (CDMA), Time Division Multiple Access ("TDMA"), Wideband CDMA (WCDMA), Global System for Mobility (GSM), and other RATs. While the communication links 132, 136, 142, and 146 are illustrated as single links, each of the communication links may include a plurality of frequencies or frequency bands, each of which may include a plurality of logical channels. Additionally, each of the communication links 132, 136, 142, and 146 may utilize more than one RAT.

Figure 2:
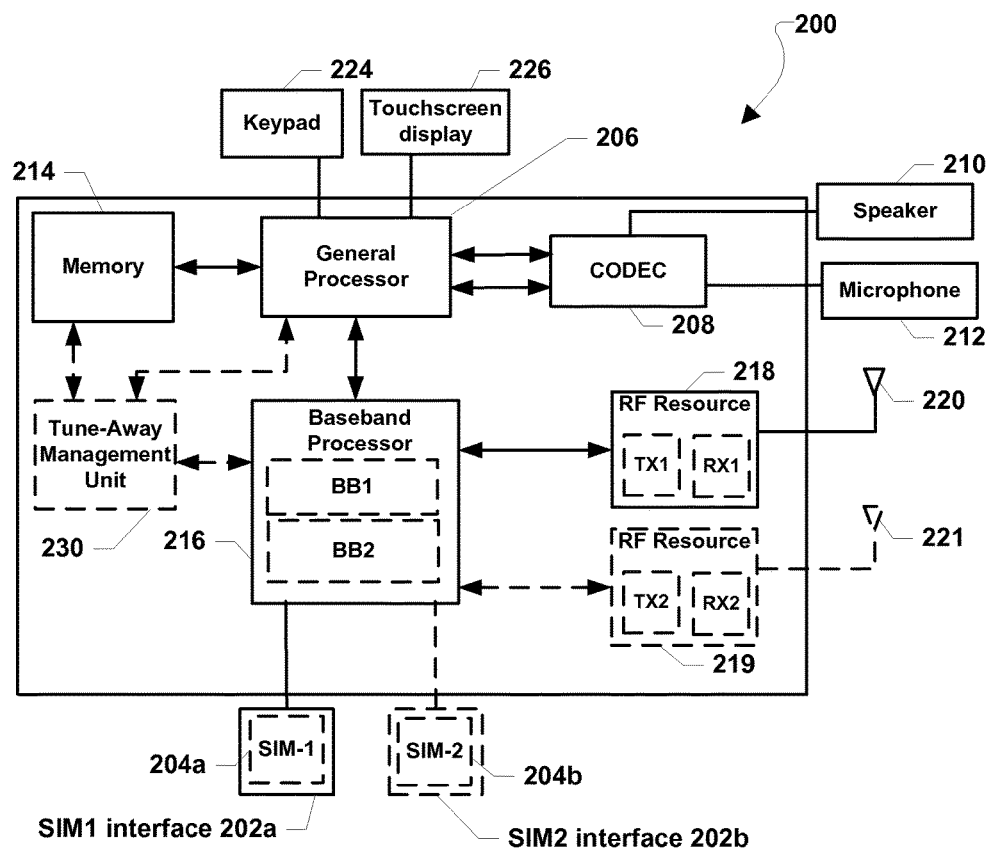
FIG. 2 is a component block diagram of a wireless device according to various embodiments.

FIG. 2 is a component block diagram of a mobile communication device 200 suitable for implementing various embodiments. With reference to FIGS. 1-2, in various embodiments, the mobile communication device 200 may be similar to one or more of the mobile communication devices 110 and 120 as described. The mobile communication device 200 may include a first SIM interface 202a, which may receive a first identity module SIM-1 204a that may be associated with a first subscription. The mobile communication device 200 may also optionally include a second SIM interface 202b, which may receive an optional second identity module SIM-2 204b that may be associated with a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the multi-standby communication device, and thus need not be a separate or removable circuit, chip, or card.

A SIM used in various embodiments may contain user account information, an international mobile subscriber identity (IMSI), a set of SIM application toolkit (SAT) commands and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification.

The mobile communication device 200 may include at least one controller, such as a general-purpose processor 206, which may be coupled to a coder/decoder ("CODEC") 208. The CODEC 208 may in turn be coupled to a speaker 210 and a microphone 212. The general-purpose processor 206 may also be coupled to at least one memory 214. The memory 214 may be a non-transitory computer readable storage medium that stores processor-executable instructions. For example, the instructions may include routing communication data relating to the first or second subscription though a corresponding baseband-RF resource chain. The memory 214 may store an operating system (OS), as well as user application software and executable instructions. The memory 214 may also store application data, such as an array data structure.

The general-purpose processor 206 and the memory 214 may each be coupled to at least one baseband modem processor 216. Each SIM and/or RAT in the mobile communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as an "RF resource." In some embodiments, baseband-RF resource chains may share the baseband modem processor 216 (i.e., a single device that performs baseband/modem functions for all RATs on the mobile communication device 200). In other embodiments, each baseband-RF resource chain may include physically or logically separate baseband processors (e.g., BB1, BB2).

An RF resource 218 may be a transceiver that performs transmit/receive functions for each of the SIMs/RATs on the mobile communication device. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216.

In some optional embodiments, the mobile communication device 200 may include an optional RF resource 219 configured similarly to the RF resource 218 and coupled to an optional wireless antenna 221. In such embodiments, the mobile communication device 200 may leverage the multiple RF resources 218, 219 and antennae 220, 221 to perform diversity receiver reception during a tune-away event.

In some embodiments, the general-purpose processor 206, the memory 214, the baseband processor(s) 216, and the RF resources 218, 219 may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them.

Functioning together, the two SIMs 204a, 204b, the baseband processor BB1, BB2, the RF resources 218, 219, and the wireless antennas 220, 221 may constitute two or more RATs. For example, the mobile communication device 200 may be an SRLTE communication device that includes a SIM, baseband processor, and RF resource configured to support two different RATs (e.g., LTE and GSM). More RATs may be supported on the mobile communication device 200 by adding more SIM cards, SIM interfaces, RF resources, and antennae for connecting to additional mobile networks.

In some embodiments (not illustrated), the mobile communication device 200 may include, among other things, additional SIM cards, SIM interfaces, a plurality of RF resources associated with the additional SIM cards, and additional antennae for connecting to additional mobile networks.

The mobile communication device 200 may optionally include a tune-away management unit 230 configured to manage the respective access of RATs associated with the first and second SIMs 204a, 204b to the RF resource 218 (and optionally the RF resource 219) in anticipation of or during a tune-away event. In some embodiments, the tune-away management unit 230 may determine whether to initiate a tune-away event from a first RAT to a second RAT or whether to prevent or block a tune-away event in order to improve data reception on the first RAT during the duration of the tune-away event. In some embodiments, the tune-away management unit 230 may be implemented within the general-purpose processor 206. In other embodiments, the tune-away management unit 230 may be implemented as a separate hardware component (i.e., separate from the general-purpose processor 206). In some embodiments, the tune-away management unit 230 may be implemented as a software application stored within the memory 214 and executed by the general-purpose processor 206.

Figure 3:
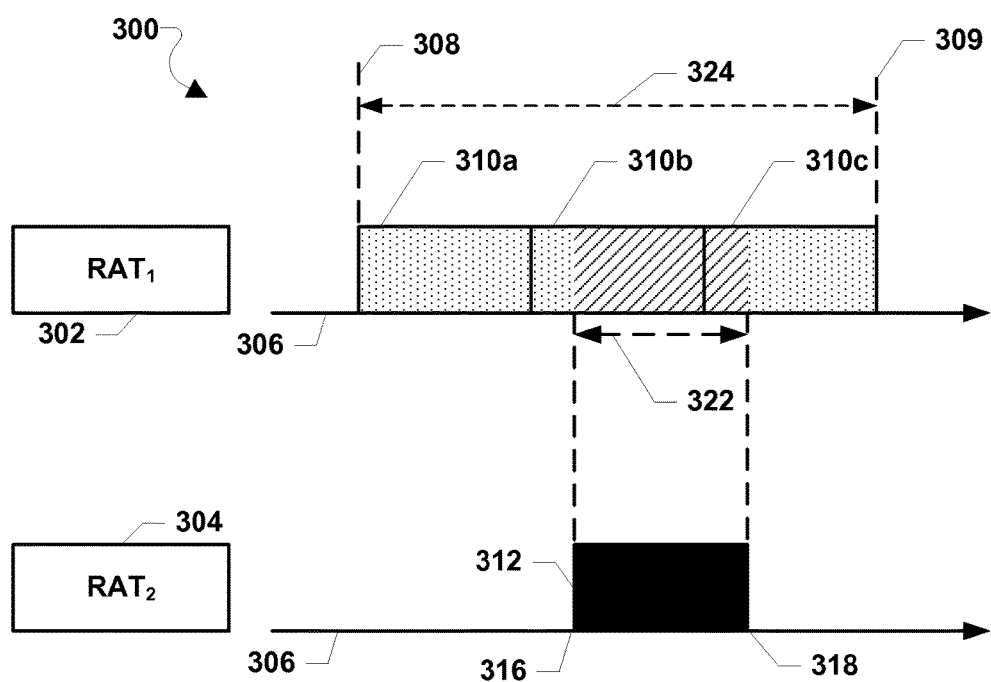
FIG. 3 is a timeline diagram illustrating reception activities of a first RAT and a second RAT sharing an RF resource during tune-away events.

FIG. 3 illustrates a timeline 300 of a tune-away event occurring over time 306 between a first RAT 302 and a second RAT 304 sharing an RF resource (e.g., the RF resource 218 of FIG. 2) on the same mobile communication device (e.g., the mobile communication devices 110 and 200 of FIGS. 1-2). In some embodiments, the first RAT 302 and the second RAT 304 may be associated with the same subscription (e.g., on an SRLTE communication device) or with different subscriptions (e.g., on a DSDS communication device).

With reference to FIGS. 1-3, a processor of the mobile communication device (e.g., the processors 206 and/or 216 of FIG. 2) may place the first RAT 302 into an active mode starting at a time 308, such as in response to initiating a voice or data communication session. At the time 308, the mobile communication device may begin communication with a communication network associated with the first RAT 302, for example, by receiving media data objects 310a-310c (e.g., by streaming media, such as by eMBMS). The reception activities of the first RAT 302 may continue in the active mode until a time 309 at which the first RAT 302 exits the active mode, such as when the communication session using the first RAT 302 ends.

While the first RAT 302 is active (i.e., a duration 324), the second RAT 304 may be in an idle-standby mode, during which time the second RAT 304 may not need regular access to the RF resource shared with the first RAT 302. However, the second RAT 304 may occasionally need to perform various tune-away operations, for example, in order to monitor for pages from a mobile network, in order to stay connected to that network, to take cell reselection measurements to determine whether to reselect to a neighboring cell, to provide updated location information to the mobile network of the second RAT 304 for location services, and for other operations. The tune-away operations of the second RAT 304 may require different amounts of time to complete (e.g., 80 ms to complete page monitoring, and approximately 200 ms to complete cell reselection measurements). Moreover, some tune-away operations may be cyclical in nature (e.g., discontinuous reception).

While the first RAT 302 may be active for the duration 324, the second RAT 304 may be scheduled to perform tune-away operations 312 starting at time 316. At the scheduled tune-away time 316, the mobile communication device may initiate a tune-away event 322 in which the shared RF resource is tuned from the first RAT 302 to the second RAT 304, thus stopping or interrupting reception activities of the first RAT 302 and enabling the second RAT 304 to use the shared RF resource to perform the tune-away operations 312 until time 318 when the tune-away event 322 ends. For example, the processor of the mobile communication device may grant the second RAT 304 access to the shared RF resource for the tune-away event 322 in order to perform the tune-away operations.

During the tune-away event 322, the first RAT 302 may be unable to receive data from its network, which may degrade the performance of the first RAT 302 if data not received during the tune-away cannot be recovered through error correction mechanisms. For example, the first RAT 302 may lose some or all of the data included in the objects 310b and 310c during the tune-away event 322 because the first RAT 302 does not have access to the shared RF resource and thus cannot receive data in the segments 310b and 310c during the tune-away event 322.

To enable the mobile communication device to recover any data for each of the segments 310a-310c that is lost or partially received, the media data may include redundancy information. However, the amount of redundancy information required to provide a threshold level of performance of the first RAT 302 may increase as the severity of the data loss increases.

Figure 4:
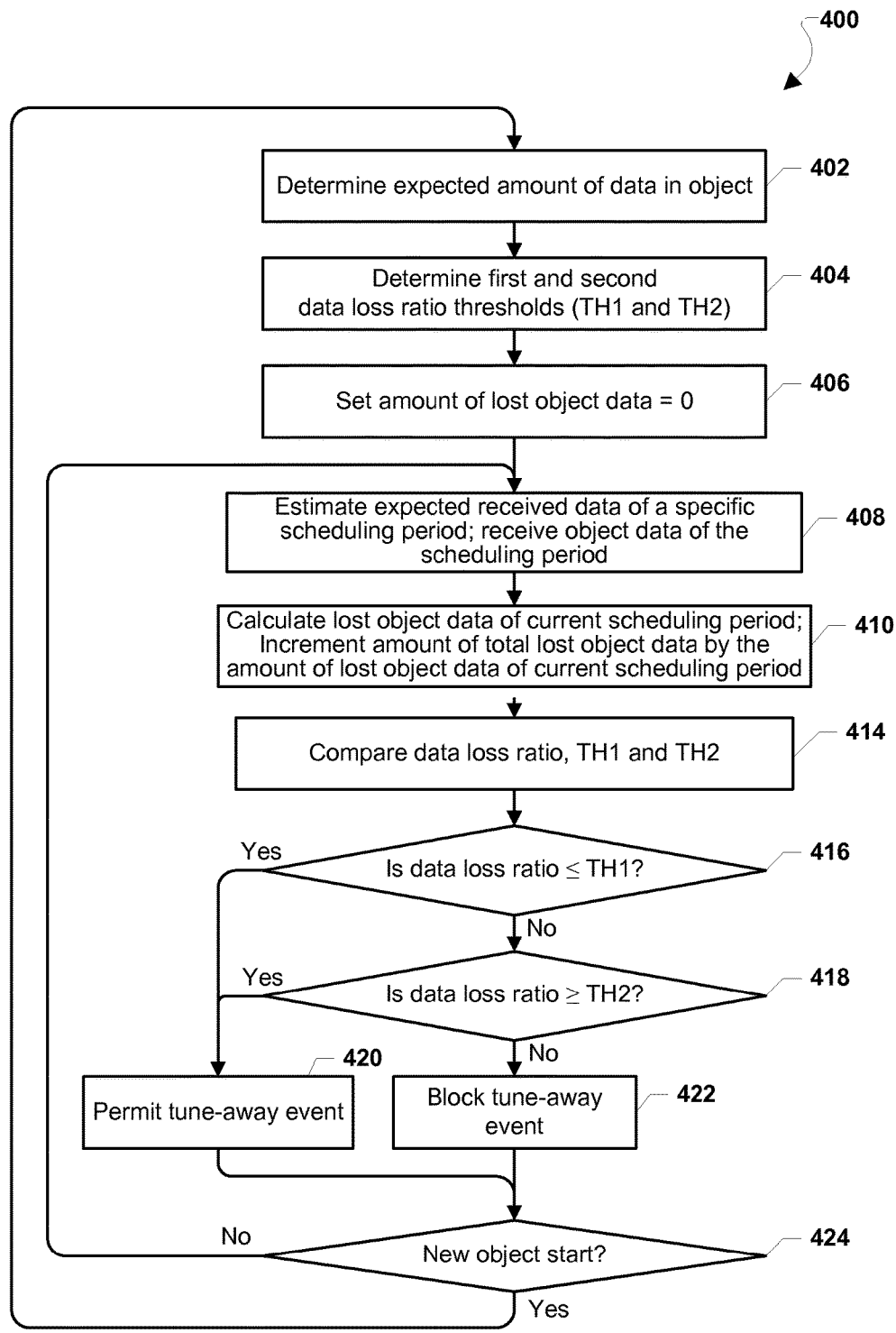
FIG. 4 is a process flow diagram illustrating a method for managing throughput in a wireless device according to various embodiments.

FIG. 4 illustrates a method 400 for managing a tune-away event according to some embodiments. With reference to FIGS. 1-4, the method 400 may be implemented by a mobile communication device processor (e.g., the general purpose processor 206, the baseband modem processor 216, or the tune-away management unit 230 of the mobile communication device 200, a separate controller, and/or the like) for managing a tune-away event. The device processor may begin performing the operations of method 400 in response to the mobile communication device beginning to receive requested data, such as media data (also referred to as a media file).

In some embodiments, the media data may be transmitted in objects, such as a FLUTE object or another similar data block, package, or segment for transmission. For example, a content server or other device that transmits the media data to the mobile communication device may partition the media into FLUTE objects according to the FLUTE protocol, and may transmit one FLUTE object in a streaming media segment, according to a protocol such as Dynamic Adaptive Streaming over HTTP ("DASH") or another streaming media protocol. As an example, in DASH, one segment may be transmitted in approximately 1-3 seconds.

In block 402, the device processor may determine an expected amount of data in a data object. The device processor may determine the expected amount of data based on scheduling information received by the mobile communication device, such as multicast channel scheduling information ("MSI") or similar information sent by the network to the mobile communication device. For example, the scheduling information may indicate a scheduling period (such as a multicast channel scheduling period ("MSP")) during which a certain amount of data may be scheduled for delivery to the mobile communication device. For example, the scheduling information may indicate a number of subframes, a number of bytes, a number of packets, or another measurement of an amount of data, to be transmitted during the scheduling period.

In some embodiments, the device processor may determine the expected amount of data in the object based on information sent in a first packet or packets of the object, such as a file description table ("FDT"), that may describe object information including a total number of bytes included in the object. In some embodiments, the device processor may determine the expected amount of data based on a data rate of the transmission of the object data and an object duration. The device processor may employ several methods of determining the expected amount of object data because the FDT or other such information may be lost in transmission.

In block 404, the device processor may determine a first data loss ratio threshold and a second data loss ratio threshold. The first data loss ratio threshold ("TH1") may indicate a fraction of data loss from which data recovery is possible using redundant data (such as FEC data) received with the object data that the mobile communication device receives prior to or after a tune-away event. The first data loss ratio threshold may be based on an amount (such as a percentage) of redundant data provided, or expected, with the object data. The amount of redundant data may be indicated in a message from the communication network, such as via a service discovery channel ("SDCH") or similar information that may provide overhead information from the communication network to the mobile communication device.

The second data loss ratio threshold ("TH2") may indicate a fraction of data loss from which data recovery is not possible even if an impending tune-away event were blocked so that object data (including redundant data) may be received over a first RAT during the period of time scheduled for the tune-away event. The second data loss ratio threshold may be based on the first data loss ratio threshold and an additional data loss ratio factor or offset ("O"). The additional factor may be based on the scheduling period, a number of services or streams that the mobile communication network is transmitting, and an expected duration of the tune-away event. In some embodiments, the second data loss ratio threshold may be expressed as TH2=TH1+O. In some embodiments, the device processor may dynamically determine TH1 based on changes (if any) in the amount of redundant data in each object. In some embodiments, the device processor may dynamically determine TH2 based on any changes in TH1, as well as any changes in the scheduling period, the number of services or streams that the mobile communication network is transmitting, or the expected duration of the tune-away event.

In block 406, upon or just prior to beginning to receive the object, the device processor may set to zero a counter used to maintain a count of the amount of object data (i.e., data of an object) that is lost or a running ratio of data loss during reception of the object. In block 408, the mobile communication device may estimate an expected amount of data of a specific scheduling period (e.g., an MSP) to be received, and may begin to receive the object data of that scheduling period.

In block 410, as the mobile communication device receives the object data, the device processor may determine an amount of lost object data and may increment the counter (i.e., the amount of lost object data) when bytes of object data are garbled or not received. In this manner, the processor may maintain a running count of the amount of lost object data or a running ratio of data loss. The device processor may calculate the amount of lost object data of a scheduling period (e.g., an MSP) by subtracting an amount of data actually received of the scheduling period from the expected amount of object data of the scheduling period. To determine the data loss ratio of the object data, the sum of the amount of lost object data of those scheduling periods that have occurred so far for this object may be divided by the expected amount of object data.

In some embodiments, the device processor may monitor the received data based on a number of bytes, a number of subframes, a number of IP packets, or another measure of data received. In some embodiments, the device processor may map a subframe to an amount of data expected at the transmission data rate (such as a modulation and coding scheme) indicated to the mobile communication device by the communication network, and the device processor may determine the data loss ratio of the object data using the mapping. In some embodiments, the device processor may update the data loss ratio of the object data or update a data loss ratio ($R_{loss}$) at the end of each scheduling period (e.g., after each MSP).

In various embodiments, the amount of lost object data of a scheduling period may be expressed as $N_{loss}=N_{exp}-N_{rx}$, in which $N_{exp}$ represents the expected amount of object data of a scheduling period, and $N_{rx}$ represents an amount of object data received of a scheduling period by the mobile communication device. For example, in block 406, the device processor may set $N_{loss}=0$, and in block 410, the device processor may update and increment $N_{loss}$ by $(N_{exp}-N_{rx})$ In various embodiments, the amount of lost object data may be expressed as a data loss ratio of the amount of lost object data to the total amount of object data since the start of the object, e.g., $R_{loss}$, which may be expressed as $R_{loss}=M_{loss}/N_{tot}$, in which $N_{loss}$ represents the amount of lost object data, and $N_{tot}$ represents a total amount of data in the object, including source and redundancy.

In various embodiments, the device processor may determine the data loss ratio of the object data based on one or more of lost subframes (e.g., multicast-broadcast single frequency network ("MBSFN") subframes), a number of bytes, a number of IP packets, or any other measure of an amount of data. In some embodiments, the device processor may map an MBSFN subframe to an amount of data (e.g., a number of bytes) using a data rate specified in network configuration information sent by the communication network (e.g., a base station) to the mobile communication device (e.g., a data rate, or a modulation and coding scheme ("MCS")).

In some embodiments, the device processor may detect the start of a new object by detecting certain information in the object data. For example, a FLUTE header may include an Encoded Symbol Identifier ("ESI") that may include a value (e.g., zero) that indicates the beginning of a new object. However, the packet including the header indicating the beginning of a new object may be lost or corrupted. Therefore, additionally or alternatively, the device processor may start a timer at the beginning of each detected new object, and based on the object duration the device processor may estimate the beginning of a new object. Additionally or alternatively, the device processor may use a known length of an object to estimate the object duration. For example, data packets of the object may be numbered sequentially, and based on the detected sequence number of any packet the device processor may estimate the remaining packets in the current object arriving at the current data rate, and thus may predict the beginning of the next object. Thus, the device processor may detect or estimate object boundaries using one or more methods to determine whether a new object has started in determination block 424.

In response to determining that a new object start has been detected (i.e., determination block 424="Yes"), the device processor may determine an expected amount of data in the new object in block 402 as described. In response to determining that a new object start has not been detected (i.e., determination block 424="No"), the device processor may continue to receive object data of the current object in block 408.

Periodically the device processor may compare the data loss ratio of the object data to the first and second data loss ratio thresholds (TH1 and TH2, respectively) in block 414. The first data loss ratio threshold may indicate an amount of data loss that is recoverable or repairable using redundant data (such as FEC data) received with the object data that the mobile communication device receives prior to or after a tune-away event. The second data loss ratio threshold may indicate an amount of data loss that may not be recoverable or repairable even if an impending tune-away event were blocked so that object data (including redundant data) may be received over a first RAT during the period of time scheduled for the tune-away event.

In determination block 416, the device processor may determine whether the data loss ratio of the object data is less than (or equal to) the first data loss ratio threshold. In response to determining that the data loss ratio of the object data is less than (or equal to) the first data loss ratio threshold (e.g., $R_{loss} \leq TH1$) (i.e., determination block 416="Yes"), the device processor may permit the performance of the tune-away event in block 420. For example, determining that the data loss ratio of the object data is less than or equal to the first data loss ratio threshold may indicate that, while some object data was lost, the amount of lost object data was not great enough to prevent the object from being recovered. Thus, the device processor may permit the tune away.

In response to determining that the data loss ratio of the object data is not less than (or equal to) the first data loss ratio threshold (i.e., determination block 416="No"), the device processor may determine whether the data loss ratio of the object data is greater than or equal to the second data loss ratio threshold in determination block 418. In response to determining that the data loss ratio of the object data is greater than (or equal to) the second data loss ratio threshold (e.g., $R_{loss} \geq TH2$) (i.e., determination block 418="Yes"), the device processor may permit the performance of the tune-away event in block 420. For example, determining that the data loss ratio of the object data is greater than or equal to the second data loss ratio threshold may indicate that so much object data was lost that preventing the tune away would not permit sufficient additional object data to be received to enable recovery of the object. Thus, the device processor may permit the tune away.

In response to determining that the data loss ratio of the object data is not greater than (or equal to) the second data loss ratio threshold (i.e., determination block 418="No"), the device processor may block or prevent the performance of the tune-away event in block 422. In other words, the device processor may block the tune-away event in response to determining that the data loss ratio of the data is greater than the first data loss ratio threshold and less than the second data loss ratio threshold. Accordingly, the mobile communication device may continue to receive object data using the first RAT during the otherwise-scheduled tune-away event. In some embodiments, the determination that the data loss ratio of the object data is not greater than or equal to the second data loss ratio threshold, but is greater than the first data loss ratio threshold, may be expressed as $TH1 < R_{loss} \leq TH2$. In some embodiments, this determination may be expressed as $TH1 \leq R_{loss} < TH2$.

Whether the device processor permits the tune-away event in block 420 or blocks the tune-away event in block 422, the device processor may detect the start of a new object or whether the current object is still being received by the mobile communication device in determination block 424. In response to determining that a new object start has not been detected (i.e., determination block 424="No"), the device processor may continue to receive object data of the current object in block 408. In response to determining that a new object start has been detected (i.e., determination block 424="Yes"), the device processor may repeat the operations for the new object by determining an expected amount of data in the new object in block 402 as described.

Figure 5:
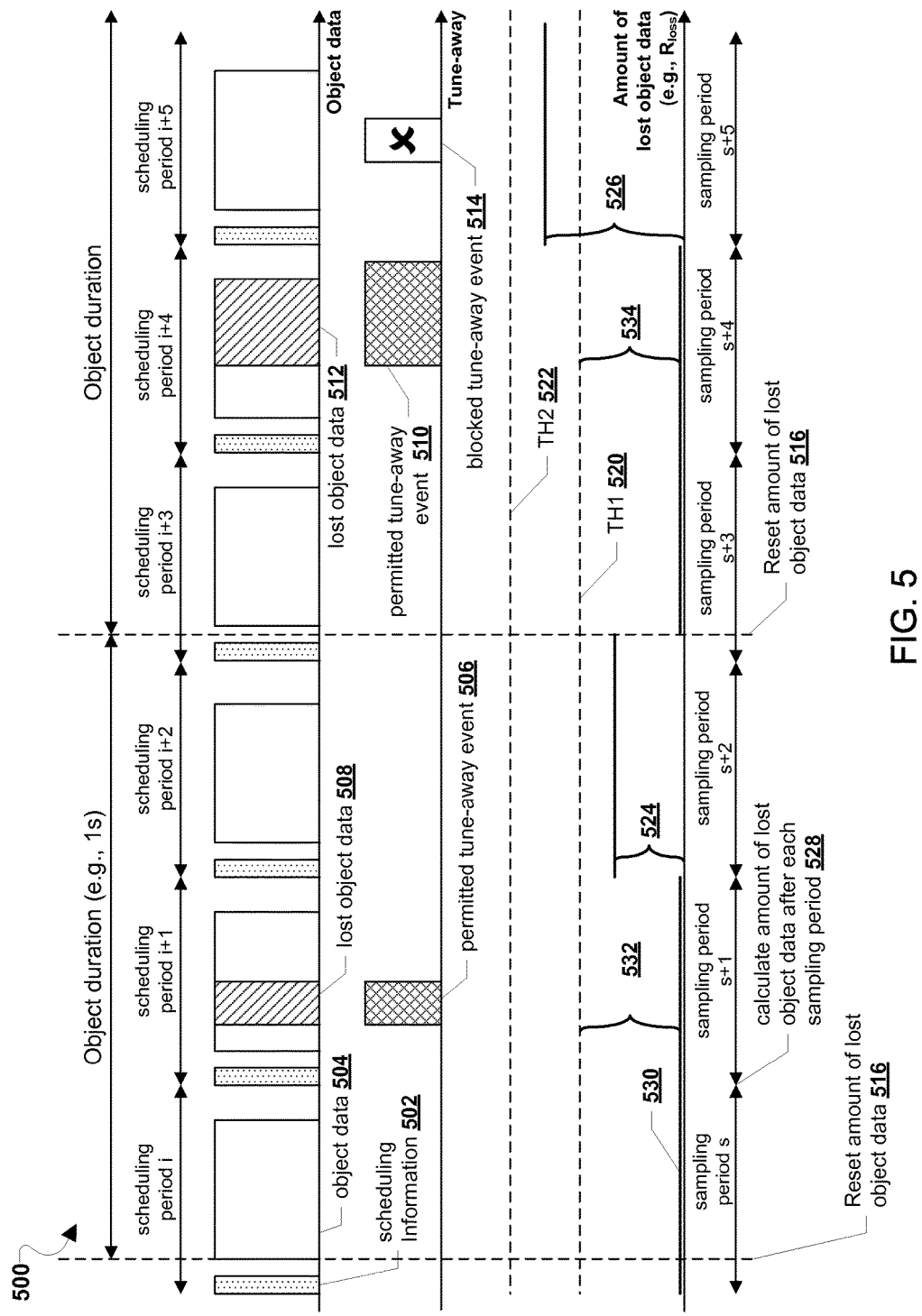
FIG. 5 is a timeline diagram illustrating a method for managing a tune-away event according to various embodiments.

FIG. 5 is a timeline diagram 500 of example events and operations that illustrate various embodiments. With reference to FIGS. 1-5, the example timeline may begin when the mobile communication device begins to receive requested object data, such as media data. At a beginning of a first scheduling period ("scheduling period i") the mobile communication device may receive scheduling information 502 related to object data 504 that may be scheduled for transmission to the mobile communication device during the scheduling period i. The scheduling information may include multicast channel scheduling information ("MSI") or similar information sent by the network to the mobile communication device. Using the scheduling information, the device processor may determine an expected amount of object data in a scheduling period. For example, the scheduling information may indicate a duration of the scheduling period i (e.g., an MSP) during which a certain amount of data may be scheduled for delivery to the mobile communication device. As another example, the scheduling information may indicate a number of subframes, a number of bytes, a number of packets, or another measurement of an amount of data, to be transmitted during the scheduling period i.

The device processor may further determine a first data loss ratio threshold ("TH1") 520 and a second data loss ratio threshold ("TH2") 522. TH1 may indicate a data loss ratio at which the object is recoverable or repairable using redundant data (such as FEC data) received with the object data that the mobile communication device receives prior to or after a tune-away event. TH2 may indicate data loss ratio at which the object may not be recoverable or repairable even if an impending tune-away event were blocked so that object data (including redundant data) may be received over a first RAT during the period of time scheduled for the tune-away event. The second data loss ratio threshold may be based on the first data loss ratio threshold and an additional factor (offset). The additional factor may be based on the scheduling period, a number of services or streams that the mobile communication network is transmitting, and an expected duration of the tune-away event.

At the beginning of the receipt of an object (i.e., at the beginning of an object duration), the device processor may reset 516 a counter of amount of lost object data or calculation of the data loss ratio (e.g., setting $R_{loss}$ equal to zero). In some embodiments, the device processor may calculate the amount or ratio of lost object data per scheduling period, while in some embodiments another period (such as 10 ms) may be used to determine the amount of lost object data or total data loss ratio ($R_{loss}$). The mobile communication device may begin to receive the object data 504. As the mobile communication device receives the object data 504, the device processor may update the data loss ratio of the object data.

In some embodiments, the device processor may determine the amount of lost object data or data loss ratio during a sampling period s, for example, determining an amount of received object data. At the end of each sampling period, the device processor may calculate 528 the data loss ratio by, for example, subtracting the amount of received data from the amount of object data expected during the current sampling period, adding that to the total amount of lost object data of previous sampling periods in current object duration and dividing by the expected amount of data. As illustrated in the diagram 500, the mobile communication device receives all of the expected object data 504 during the scheduling period i, which corresponds in this example to the sampling period s, and so a data loss ratio of the object data 530 calculated at the end of the scheduling period i is substantially zero.

At the beginning of a tune-away event 506 that is scheduled during scheduling period i+1, the device processor may compare the data loss ratio of the object data to TH1 and TH2. In this case, the device processor may determine that the data loss ratio of the object data 532 is less than TH1. (In the diagram 500, data loss ratio 532 and other data loss ratios, described below, are represented relative to the TH1 520 and/or the TH2 522.) In response to determining that the data loss ratio of the object data 532 is less than TH1, the device processor permits the tune-away event 506.

During the tune-away event 506, some object data is lost (508) because the mobile communication device does not receive object data during the permitted tune away event 506. Therefore, at the end of the scheduling period i+1, which in this example corresponds with a sampling period s+1, a data loss ratio of the object data 524 is calculated based on the amount of lost object data detected thus far during the object duration. As illustrated in the diagram 500, the data loss ratio of the object data 524 is still less than TH1.

At the beginning of the next object, the device processor may reset 516 the data loss ratio of the object data to zero. Another tune-away event 510 is scheduled during scheduling period i+4. The device processor may determine that the data loss ratio of the object data 534 is less than TH1. In response to determining that the data loss ratio of the object data 534 is less than TH1, the device processor may permit the tune-away event 510. During the tune-away event 510, some object data is lost (512) because the mobile communication device does not receive object data during the permitted tune away event 510. Therefore, at the end of the scheduling period i+4, which corresponds with a sampling period s+4 in this example, a data loss ratio of the object data 526 is calculated based on the amount of lost object data detected thus far during the object duration. At the end of the sampling period s+4, the device processor may update the data loss ratio of the object data based on the amount of lost object data determined since the beginning of the current object duration. Thus, at the end of sampling period s+4, the device processor may calculate the data loss ratio of the object data 526.

Another tune away event 514 is scheduled during scheduling period i+5. The device processor may determine that the data loss ratio of the object data 526 is greater than TH1 and less than TH2. In response to determining that the data loss ratio of the object data 526 is greater than TH1 and less than TH2, the device processor may block the tune-away event 514. When the tune-away event 514 is blocked, the mobile communication device may continue to receive object data (which may include redundant data) during the period of the scheduled tune-away event 514. The received redundant data and/or object data may be sufficient to repair or recover the object data that was lost during the permitted tune-away event 510.

Figure 6:
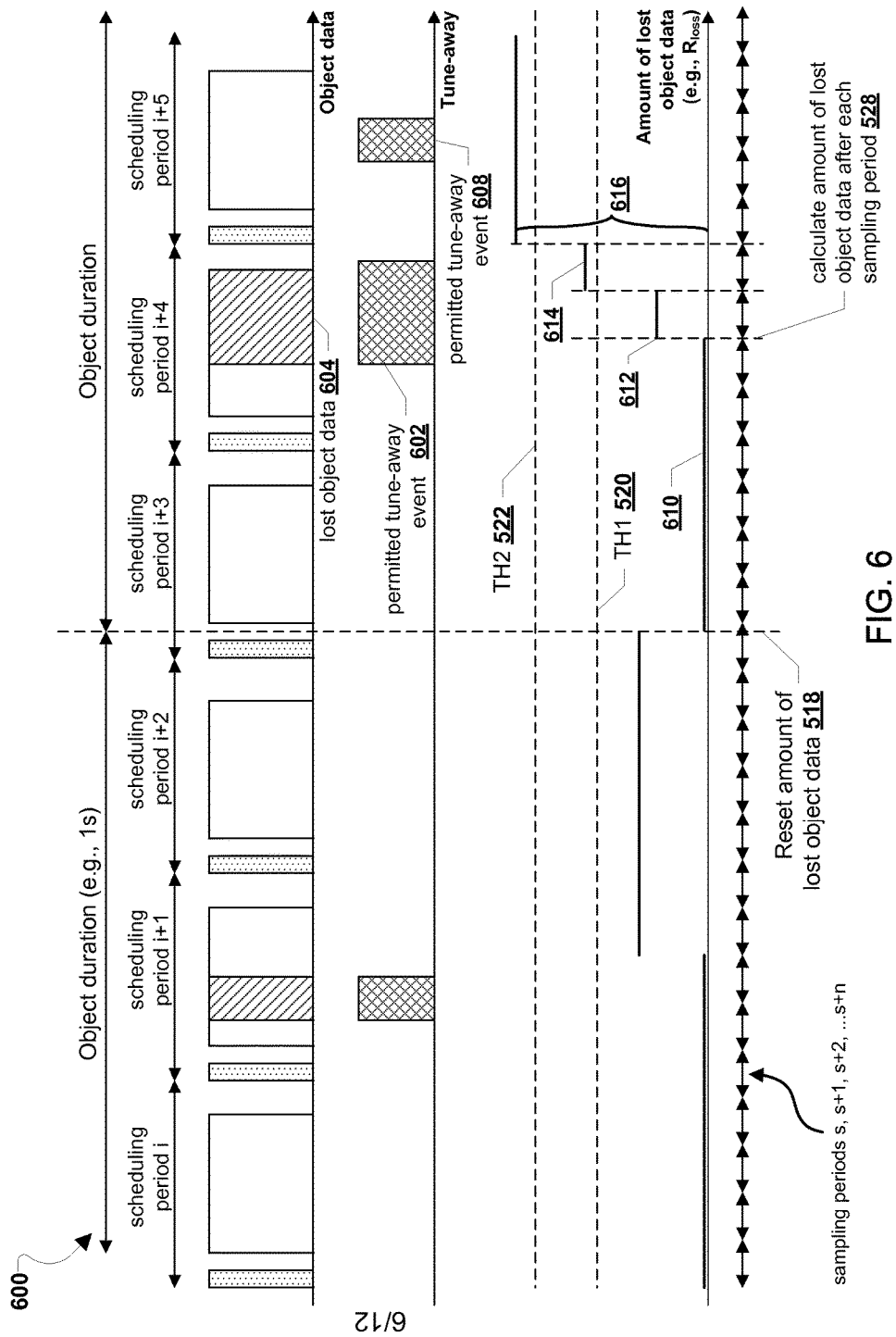
FIG. 6 is a timeline diagram illustrating a method for managing a tune-away event according to various embodiments.

FIG. 6 is a timeline diagram 500 of example events and operations that illustrate various embodiments. With reference to FIGS. 1-6, in some embodiments, the device processor may select different time periods for the sampling period. For example, as illustrated in the diagram 500, each sampling period roughly corresponds to a scheduling period (which may include, for example a FLUTE burst during an MSP of a FLUTE object). As illustrated in the diagram 600, the device processor may select a different sampling period, such as the 10 ms time period of an LTE frame.

Other time periods may also be selected for the sampling period. Because the device processor updates data loss ratio of the object data after each sampling period, the use of a shorter time period for each sampling period may enable the device processor to make more rapid and/or more accurate determinations of whether to permit or block a tune-away event by increasing the granularity of the calculation of lost object data.

As illustrated in the diagram 600, periodically (e.g., at the beginning of a tune-away event 602 that is scheduled during scheduling period i+4, as illustrated) the device processor may compare the data loss ratio of the object data 610 to TH1 and TH2. The device processor may determine that the data loss ratio of the object data 610 is less than TH1, and in response to determining that the data loss ratio of the object data 610 is less than TH1, the device processor may permit the tune-away event 602.

During the tune-away event 602, some object data is lost (604) because the mobile communication device does not receive object data during the permitted tune-away event 602. As illustrated in the diagram 600, the sampling periods may be substantially shorter than the duration of the tune-away event. The device processor may calculate 528 the data loss ratio of the object data after each sampling period, and thus may successively determine data loss ratios of the object data 612, 614, 616, each representing a data loss ratio of the object data up to the end of the previous sampling period during that object duration. (In the diagram 600, data loss ratios 612, 614, 616 are represented relative to the TH1 520 and/or the TH2 522.)

Another tune away event 608 may be scheduled during scheduling period i+5. The device processor may determine that the data loss ratio of the object data 616 is greater than TH2. In response to determining that the data loss ratio of the object data 526 is greater than TH2, the device processor may permit the tune away event 608. In other words, the device processor may determine that the data loss ratio of the object data 616 is sufficiently great (i.e., greater than or equal to TH2) to be not recoverable or repairable even if tune-away event 608 were blocked so that object data (including redundant data) may be received over a first RAT during the period of time scheduled for the tune-away event 608.

Figure 7:
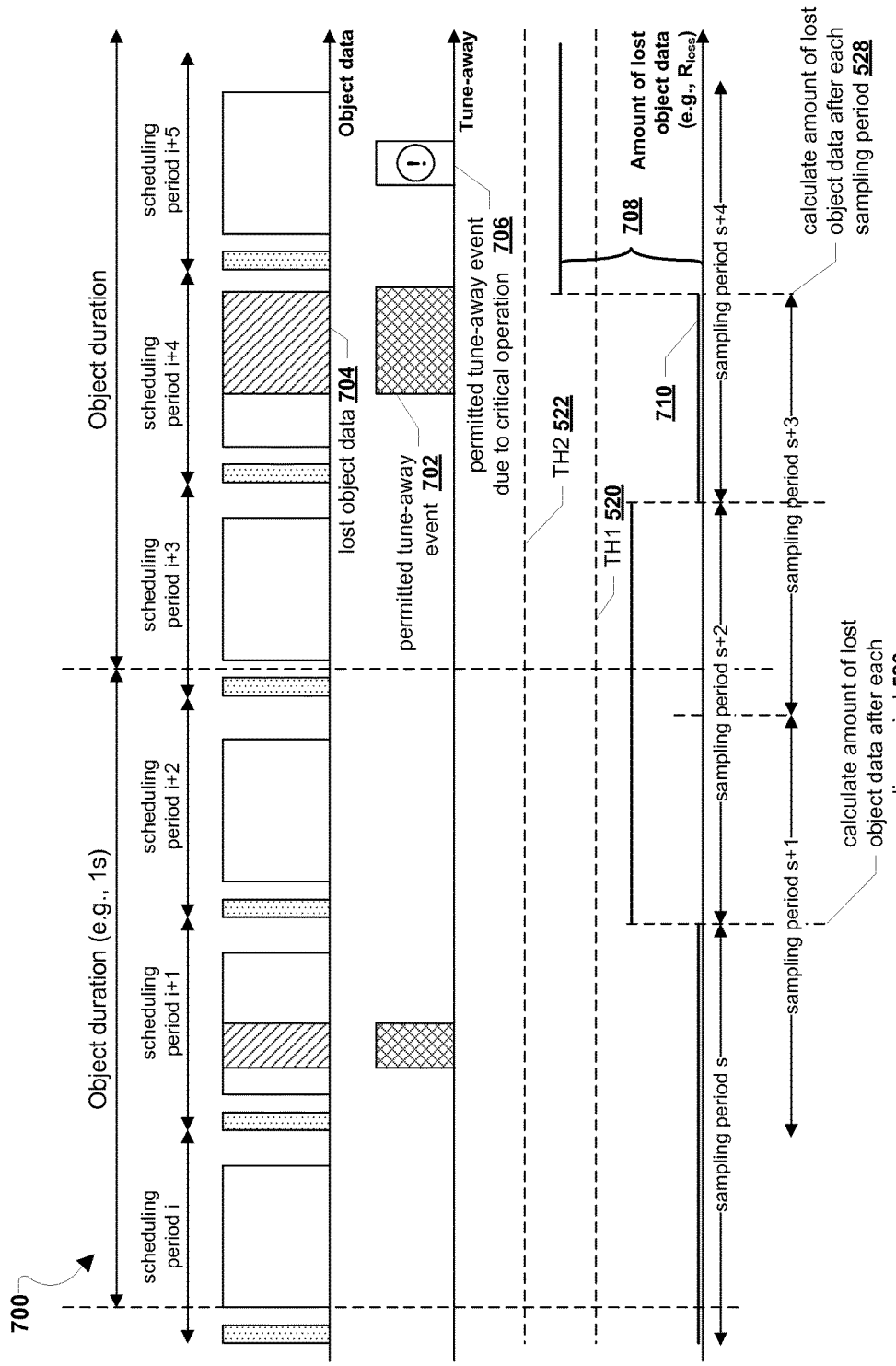
FIG. 7 is a timeline diagram illustrating a method for managing a tune-away event according to various embodiments.

FIG. 7 is a timeline diagram 700 of example events and operations that illustrate various embodiments. With reference to FIGS. 1-7, in some embodiments, the device processor may use overlapping time periods or sliding sampling windows to calculate the data loss ratio of the object data. For example, as illustrated in the diagram 700, each sampling period may roughly correspond to two scheduling periods. The device processor may calculate 528 the data loss ratio of the object data at the end of each sampling period. Further, the sampling window may shift by one scheduling period, so that the data loss ratio of the object data during each scheduling period may be used in two calculations of the data loss ratio of the object data.

In some embodiments, the data loss ratio calculated for a sampling period may be retained (e.g., in memory) during an overlapping sampling period. For example, as illustrated in the diagram 700, the data loss ratio calculated at the end of sampling period s may not be dropped during sampling period s+1, and may be retained until the data loss ratio is calculated at the end of sampling period s+2. Thus, in some embodiments, a data loss ratio may be calculated at the end of sampling periods s, s+1, s+2, etc., and further, each calculated data loss ratio may be retained in memory until the data loss ratio of the subsequent sampling period (i.e., non-overlapping sampling period) is calculated.

In some embodiments, the device processor may select a different sampling period, such as the 10 ms time period of an LTE frame, or another time period, to enable the device processor to make more rapid and/or more accurate determinations whether to permit or block a tune-away event by increasing the granularity of the calculation of lost object data.

In some embodiments, the device processor may determine that a tune-away event is scheduled for a critical operation. Examples of critical operations include (but are not limited to) monitoring for a paging message, performing idle measurements, cell reselection procedures (e.g., to receive a mobile-terminated call on the second RAT), and monitoring for a paging message after missing a selected number of consecutive paging messages.

In response to determining that the tune-away event is a critical operation, the device processor may permit a tune-away event that would otherwise be blocked. For example, with reference to FIG. 7, at the beginning of a tune-away event 702 that is scheduled during the scheduling period i+4, the device processor may compare a data loss ratio of the object data 710 to TH1 and TH2, and the device processor may determine that the data loss ratio of the object data 710 is less than TH1. In response to determining that the data loss ratio of the object data 710 is less than TH1, the device processor may permit the tune-away event 702.

During the tune-away event 702, some object data is lost 704 because the mobile communication device does not receive object data during the permitted tune-away event 702. The device processor may calculate 528 the data loss ratio of the object data after each sampling period, and thus may determine lost object data amount 708 representing an amount of object data lost up to the end of the previous sampling period during that object duration. (In the diagram 700, data loss ratios 708 and 710 are represented relative to the TH1 520 and/or the TH2 522.)

Another tune away event 706 may be scheduled during the scheduling period i+5. The device processor may determine that the data loss ratio of the object data 708 is greater than TH1 and less than TH2. In response to determining that the data loss ratio of the object data 708 is greater than TH1 and less than TH2, the device processor would otherwise block the tune away event 706. However, in response to determining that the tune-away event is a critical operation, the device processor may permit a tune-away event that would otherwise be blocked. Thus, although the device processor may determine that the data loss ratio of the object data 708 is greater than TH1 and less than TH2, the device processor may permit the tune-away event 706.

Figure 8:
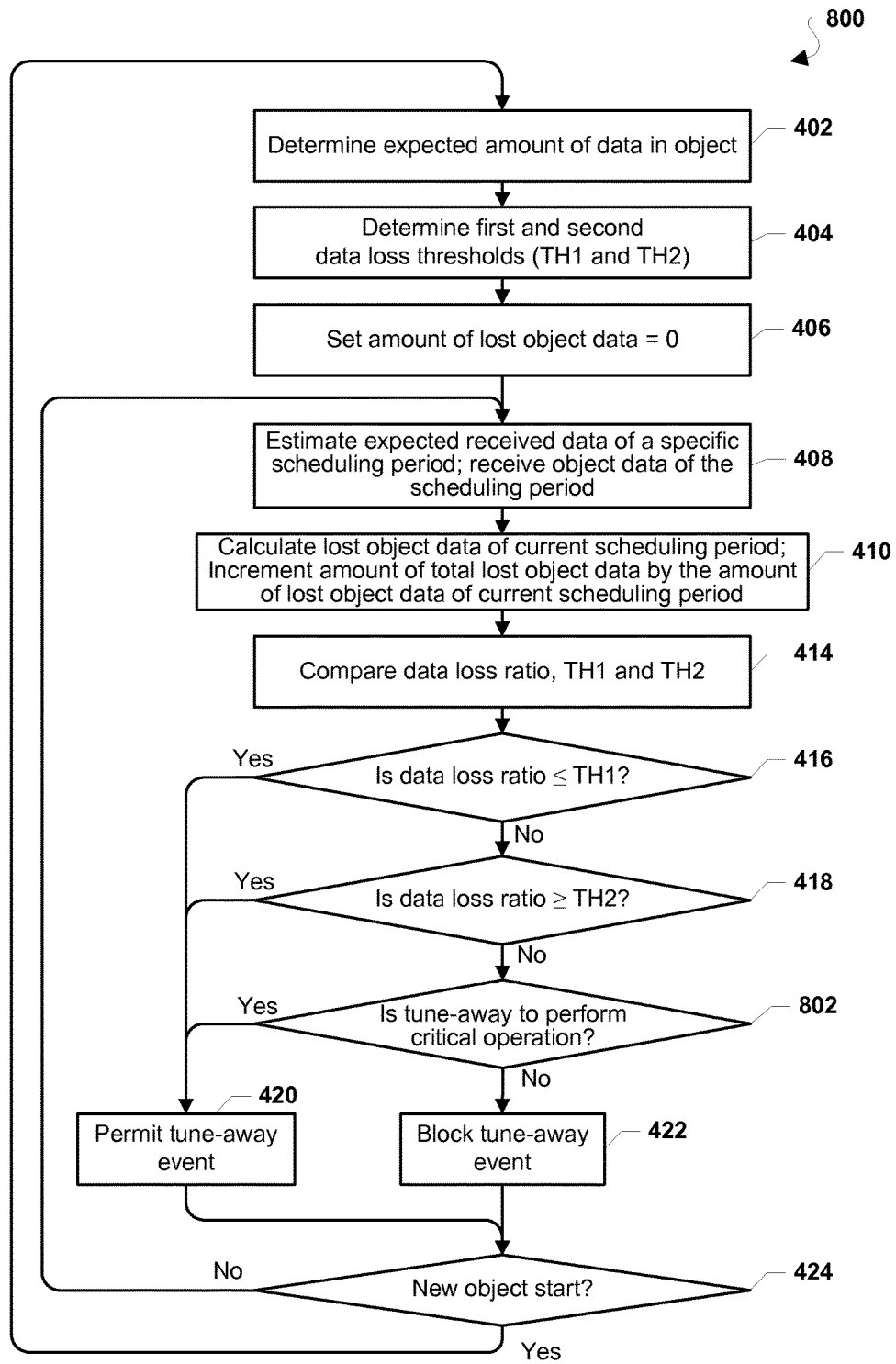
FIG. 8 is a process flow diagram illustrating a method for managing throughput in a wireless device according to various embodiments.

FIG. 8 illustrates a method 800 for managing a tune-away event according to some embodiments. With reference to FIGS. 1-8, the method 800 may be implemented by a mobile communication device processor (e.g., the general-purpose processor 206, the baseband modem processor 216, or the tune-away management unit 230 of the mobile communication device 200 of FIG. 2, a separate controller, and/or the like). In blocks 402-424, the processor may perform the operations of like number blocks of the method 400 as described.

In determination block 416, the device processor may determine whether a data loss ratio of the object data is less than (or equal to) a first data loss ratio threshold. In response to determining that the data loss ratio of the object data is not less than (or equal to) the first data loss ratio threshold (i.e., determination block 416="No"), the device processor may determine whether the data loss ratio of the object data is greater than (or equal to) the second data loss ratio threshold in determination block 418.

In response to determining that the data loss ratio of the object data is not greater than (or equal to) the second data loss ratio threshold (i.e., determination block 418="No"), the device processor may determine whether the tune-away event is to perform a critical operation in determination block 802. For example, the tune-away event may be scheduled to enable the mobile communication device to initiate a communication session over the second RAT and/or the second communication network. The tune-away event may also be scheduled to perform communication activities such as messaging services, such as text or SMS messaging. The tune-away event may also be scheduled to enable the mobile communication device to perform a location update, or to maintain its network registration to receive a page of an incoming communication session request. The tune-away event may be scheduled for other reasons that the device processor may determine to be a critical operation. On the other hand, the device processor may determine that the tune-away event is scheduled for a non-critical purpose, such as to take measurements of a signal strength of a signal using the second RAT, to reacquire a broadcast control channel ("BCCH") of the signal using the second RAT, or to decode a page for the mobile communication device.

In response to determining that the tune-away is scheduled for the mobile communication device to perform a critical operation (i.e., determination block 802="Yes"), the device processor may permit the tune-away event in block 420, even when the data loss ratio of the object data is greater than (or equal to) TH1 and less than (or equal to) TH2. In response to determining that the tune-away is scheduled for the device to perform a non-critical operation (i.e., determination block 802="No"), the device processor may block the tune-away event in block 422, and the mobile communication device may continue to receive object data using the first RAT.

While FIG. 8 illustrates determination block 802 following determination blocks 416 and 418, in various embodiments the operations of determinations blocks 802, 416, and 418 may be performed in any order. For example, the device processor may perform determination block 802 prior to determination blocks 416 and 418.

Figure 10:
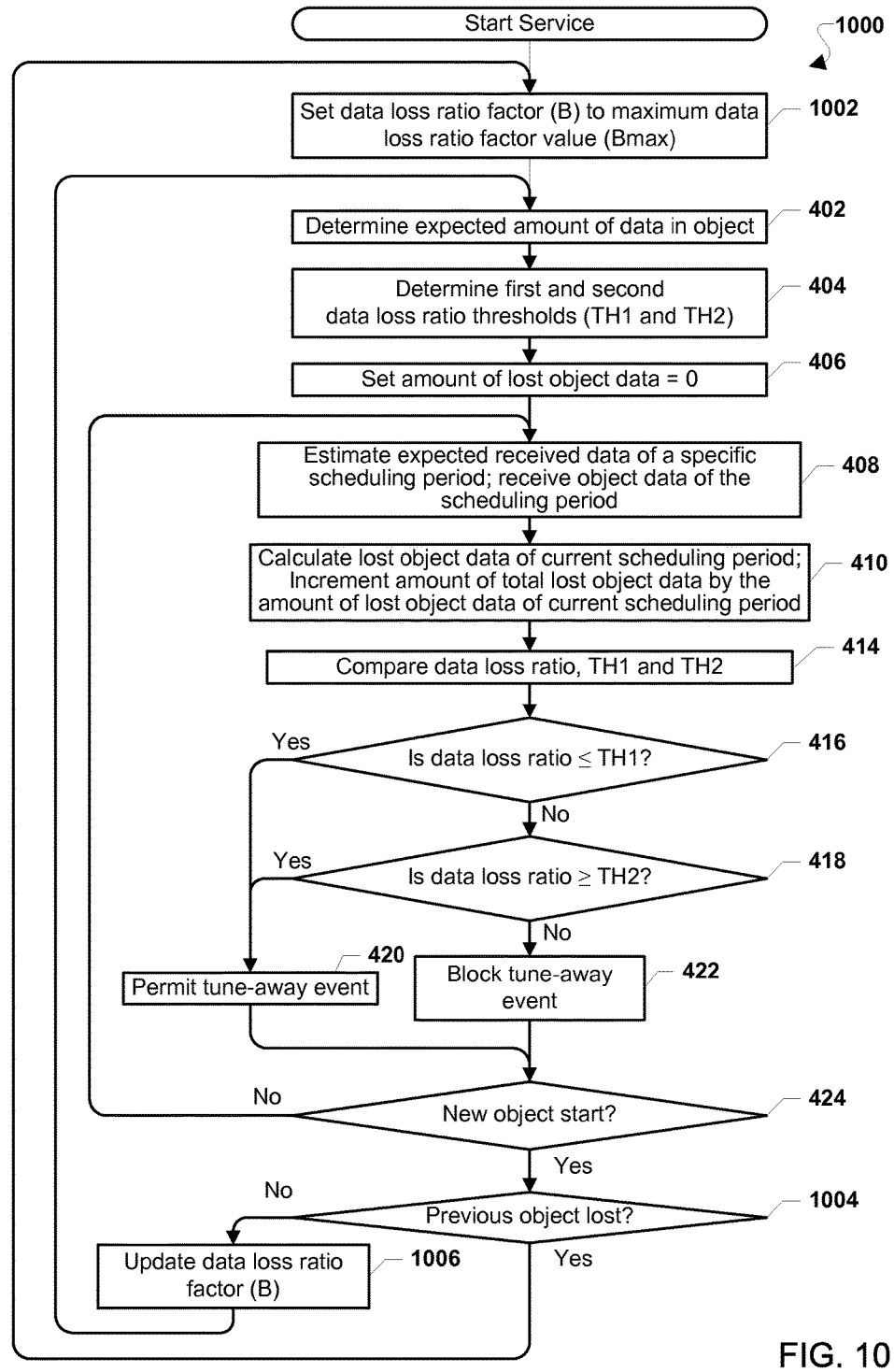
FIG. 10 is a process flow diagram illustrating a method for managing throughput in a wireless device according to various embodiments.

FIG. 10 illustrates a method 1000 for managing a tune-away event according to some embodiments. With reference to FIGS. 1-8 and 10, the method 1000 may be implemented by a mobile communication device processor (e.g., the general-purpose processor 206, the baseband modem processor 216, or the tune-away management unit 230 of the mobile communication device 200, a separate controller, and/or the like). The device processor may begin performing the operations of method 1000 in response to the mobile communication device starting a service, such as a DASH service, and requesting data, such as media data.

In block 1002, the device processor may set a data loss ratio factor (B) to a maximum data loss ratio factor value (Bmax). In various embodiments, a data loss ratio factor (B) may be initially be set to a data loss ratio factor maximum value (Bmax) at the start of a service. The data loss ratio factor maximum value (Bmax) may be a value stored in a memory (e.g., 214) of the device. For example, the data loss ratio factor maximum value (Bmax) may be 1.

As described with reference to the method 400, in block 402, the device processor may determine an expected amount of data in a data object, and in block 404, the device processor may determine a first data loss ratio threshold (TH1) and a second data loss ratio threshold (TH2).

In various embodiments, the second data loss ratio threshold (TH2) may be determined based on a redundancy level of the object (A) indicating the ratio of an amount of redundancy data to an amount of source data of the object, and a factor ($f_{FEC}$) associated with the FEC coding scheme used for object transmission indicating percentage of minimal extra redundancy in order to recover error (e.g., 1.024 for the Raptor10 FEC coding scheme). For example, the second data loss ratio threshold (TH2) may be determined according to the equation:

$$TH2=(1-f_{FEC}/(1+A))$$

In various embodiments, the first data loss ratio threshold (TH1) may be determined based on the second data loss ratio threshold (TH2) and an expected data ratio (e.g., expecteddataloss=$N_{exp}/N_{tot}$, where $N_{exp}$ represents the expected amount of object data of a scheduling period expressed as a data loss ratio of the amount of lost object data to the total amount of object data since the start of the object and $N_{tot}$ represents a total amount of data in the object, including source and redundancy) scaled by the data loss ratio factor (B). For example, the first data loss ratio threshold (TH1) may be determine according to the equation:

$$TH1=TH2-B*\text{expecteddataratio}.$$

In blocks 406-424, the processor may perform the operations of like number blocks of the method 400 as described. In response to determining that a new object start has been detected (i.e., determination block 424="Yes"), the device processor may determine whether the previous object was lost, in determination block 1004. In other words, the device processor may determine whether insufficient data for the object was received thereby preventing the object from being utilized either as received or through error correction. The device processor may determine whether the previous object was lost based on success or failure indications from a service layer or by monitoring the data loss for the previous object.

In response to determining that the object was lost (i.e., determination block 1004="Yes"), the device processor may repeat the operations for the new object by setting the data loss ratio factor (B) to the maximum data loss ratio factor value (Bmax) in block 1002 as described. In this manner, after an object is lost, the data loss ratio factor (B) may be reset to its maximum value.

In response to determining that the object was successfully received (i.e., determination block 1004="No"), the device processor may update the data loss ratio factor (B) in block 1006. The method 1000 may then proceed to block 408.

In various embodiments, as objects are successfully received, the data loss ratio factor (B) may be updated to reduce the data loss ratio factor (B) until the data loss ratio factor (B) is equal to a data loss ratio factor minimum value (Bmin). For example, when an object is successfully received the data loss ratio factor (B) may be updated based at least in part on a configurable delta value ($\Delta$) and the difference between the data loss ratio factor maximum value (Bmax) and the data loss ratio factor minimum value (Bmin) until the data loss ratio factor (B) is equal to the minimum value (Bmin). As a specific example, when an object is successfully received the data loss ratio factor (B) may be updated to be the larger of the data loss ratio factor minimum value (Bmin) or the result of:

$$B-(B\text{max}-B\text{min})*\Delta.$$

The data loss ratio factor minimum value (Bmin) may be a value stored in a memory of the device, and may be dynamically updated value. For example, the data loss ratio factor minimum value (Bmin) may be updated according to the operations of method 1100 (e.g., described with reference to FIG. 11). An initial default value for Bmin may be 0.4. The configurable delta value ($\Delta$) may be a value stored in a memory of the device, and may be proportional to a target object loss rate, such as a target video segment loss rate.

In response to updating the data loss ratio factor (B), the device processor may repeat the operations for the new object with the updated data loss ratio factor (B) in block 402 as described.

Figure 11:
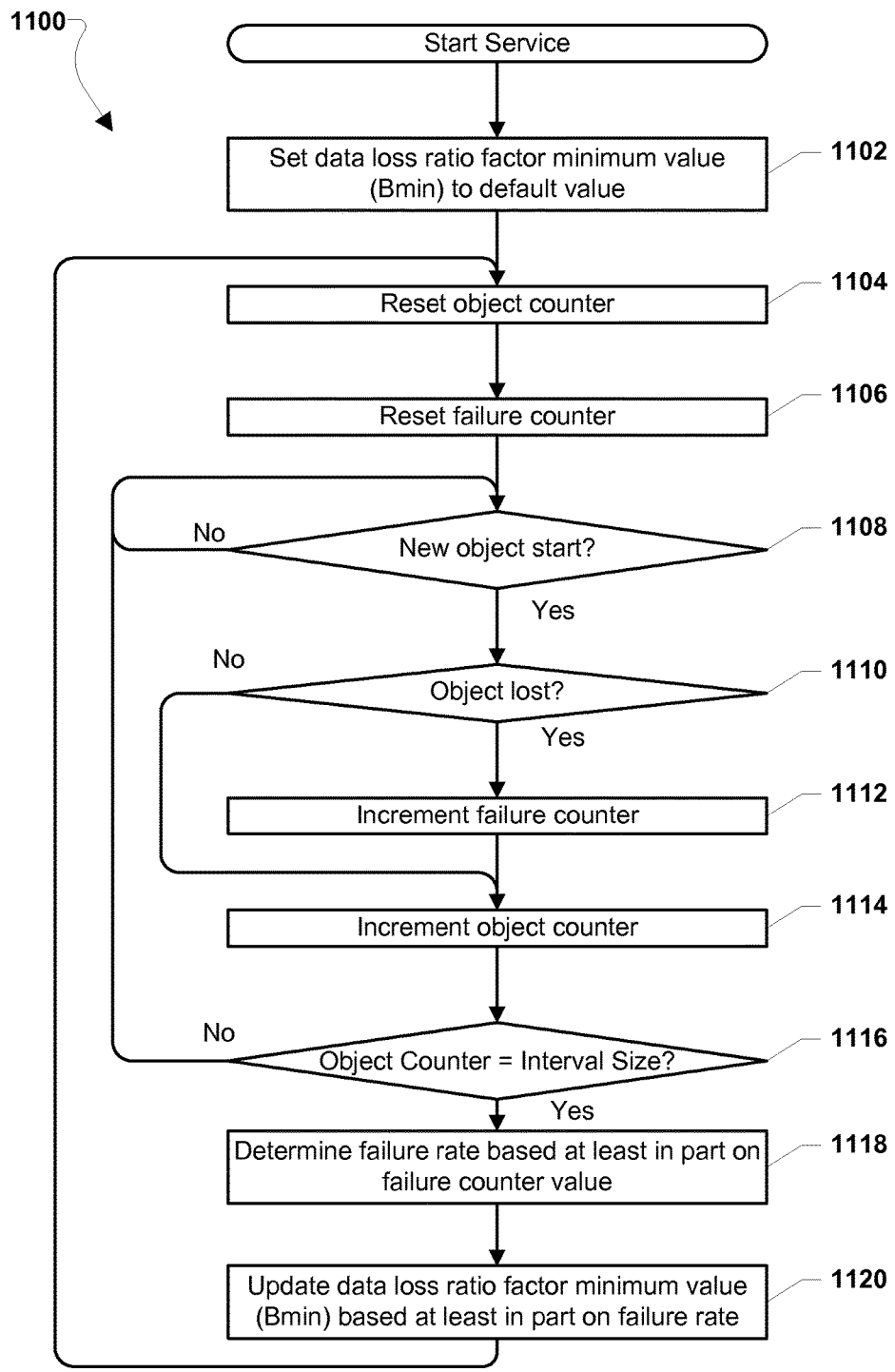
FIG. 11 is a process flow diagram illustrating a method for updating a data loss ratio factor minimum value.

FIG. 11 illustrates the method 1100 for updating a data loss ratio factor minimum value (Bmin) according to some embodiments. With reference to FIGS. 1-9, 10, and 11, the method 1100 may be implemented by a mobile communication device processor (e.g., the general-purpose processor 206, the baseband modem processor 216, or the tune-away management unit 230 of the mobile communication device 200, a separate controller, and/or the like). In various embodiments, the operations of method 1100 may be performed in conjunction with the operations of method 1000. The device processor may begin performing the operations of method 1100 in response to the mobile communication device starting a service, such as a DASH service, and requesting data, such as media data.

In block 1102, the device processor may set the data loss ratio factor minimum value (Bmin) to a default value. The default value may be a value stored in memory (e.g., 214) and may be pre-provisioned to the mobile communication device. In block 1104, the device processor may reset an object counter. The object counter may be a value stored in a memory of the device associated with the number of objects requested by the device. Resetting the object counter may include setting the value of the object counter to zero.

In block 1106, the device processor may reset a failure counter. The failure counter may be a value stored in a memory (e.g., 214) of the device associated with the number of objects requested by the device and not successfully received (e.g., lost). Resetting the failure counter may include setting the value of the object counter to zero.

In determination block 1108, device processor may determine whether a new object has started. The device processor may detect or estimate object boundaries using one or more methods to determine whether a new object has started. In some embodiments, the device processor may detect the start of a new object by detecting certain information in the object data. For example, a FLUTE header may include an Encoded Symbol Identifier ("ESI") that may include a value (e.g., zero) that indicates the beginning of a new object. However, the packet including the header indicating the beginning of a new object may be lost or corrupted. Therefore, additionally or alternatively, the device processor may start a timer at the beginning of each detected new object, and based on the object duration the device processor may estimate the beginning of a new object. Additionally or alternatively, the device processor may use a known length of an object to estimate the object duration. For example, data packets of the object may be numbered sequentially, and based on the detected sequence number of any packet, the device processor may estimate the remaining packets in the current object arriving at the current data rate, and thus may predict the beginning of the next object.

In response to determining that a new object has not started (i.e., determination block 1108="No"), the device processor may continue to wait for a new object start in determination block 1108.

In response to determining that a new object has started (i.e., determination block 1108="Yes"), the device processor may determine whether the object is lost, in determination block 1110. In other words, the device processor may determine whether insufficient data for the object was received thereby preventing the object from being utilized either as received or through error correction. The device processor may determine whether the previous object was lost based on success or failure indications from a service layer or by monitoring the data loss for the previous object.

In response to determining that the object was lost (i.e., determination block 1110="Yes"), the device processor may increment the failure counter, in block 1112. In this manner, the number of failed objects (num_failed) may be tracked and the failure counter value may be equal to the number of failed objects (num_failed).

Upon incrementing the failure counter or in response to determining that the object was successfully received (i.e., determination block 1110="No"), the device processor may increment the object counter, in block 1114. In this manner, the number of objects requested may be tracked.

In determination block 1116, the device processor may determine whether the object counter is equal to the interval size (int_size). The interval size (int_size) may be a value selected to equal a number of objects in an interval over which to update the data loss ratio factor minimum value (Bmin). The interval size (int_size) may be a value stored in a memory of the device. For example, the interval size (int_size) may be 100 objects.

In response to determining that the object counter is not equal to the interval size (int_size) (i.e., determination block 1116="No"), the device processor may determine whether a new object has started in determination block 1108 as described.

In response to determining that the object counter is equal to the interval size (int_size) (i.e., determination block 1116="Yes"), the device processor may determine a failure rate (e) based at least in part on the failure counter value (e.g., the number of failed objects (num_failed) counted in the interval), in block 1118. For example, the failure rate (e) may be determined as the failure counter value (e.g., num_failed) divided by the interval size (int_size).

In block 1120, the device processor may update the data loss ratio factor minimum value (Bmin) based at least in part on the determined failure rate (e). For example, the difference in the object failure rate (e) and an object loss target (R) may be used to determine an update ratio (u) according to the equation:

$$u=(e-R)/R.$$

The object loss target (R) may be a value stored in a memory (e.g., 214) of the mobile communication device, such as default value of 0.01 (or 1 percent). The data loss ratio factor minimum value (Bmin) may be updated by increasing the data loss ratio factor minimum value (Bmin) by a step change value (D) when the update ratio (u) is greater than or equal to 1 (i.e., updated to Bmin+D when u≥1) or may be increased by the result of multiplying the step change value (D) by the update ratio (u) when the update ratio (u) is less than 1 (i.e., updated to Bmin+(u*D) when u<1). The step change value (D) may be a value stored in a memory of the device, such as a default value of 0.05 (or 5 percent). The updated data loss ratio factor minimum (Bmin) may be applicable until the next interval, and the device processor may reset the object counter in block 1104.

Figure 12:
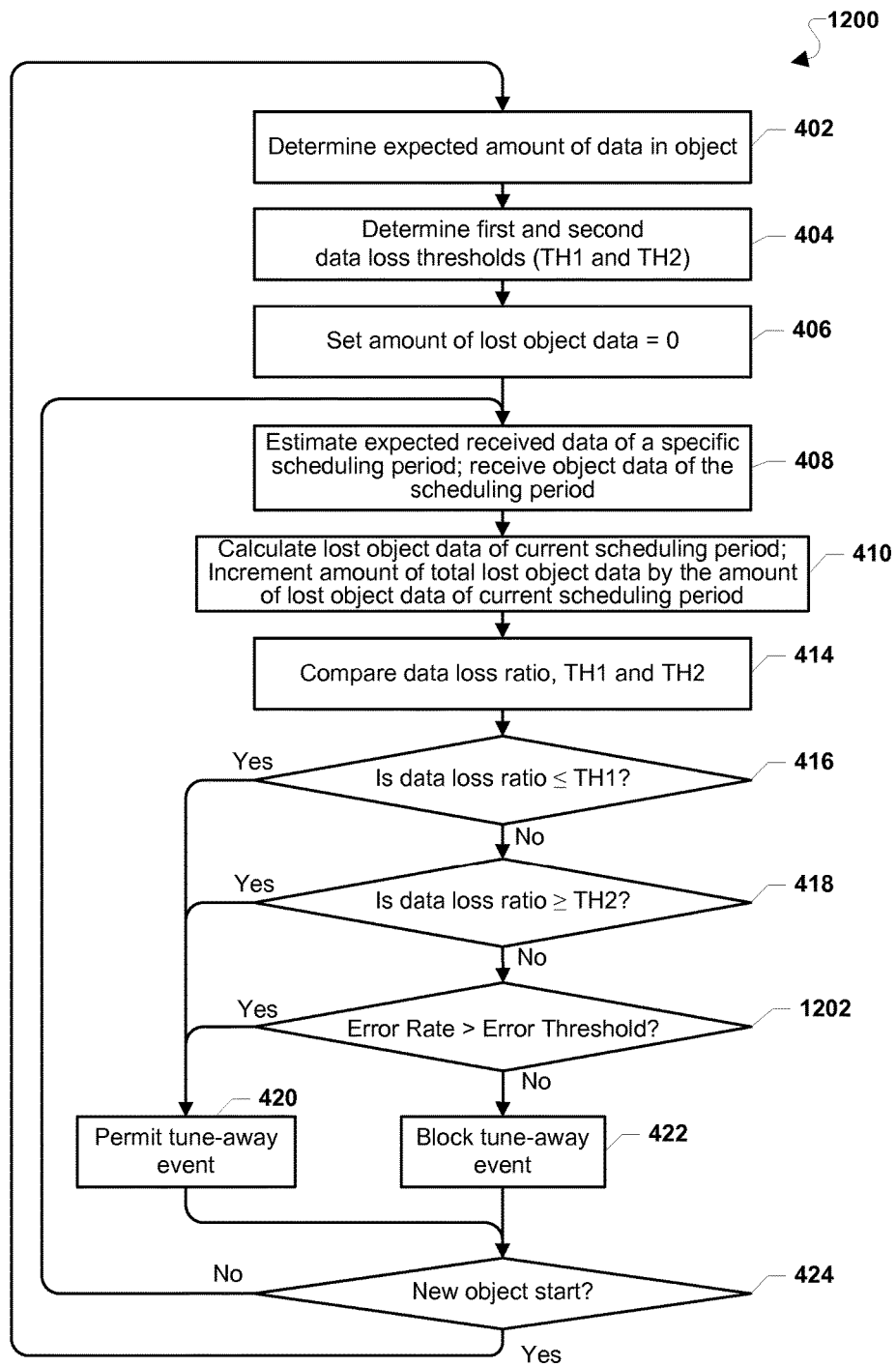
FIG. 12 is a process flow diagram illustrating a method for managing throughput in a wireless device according to various embodiments.

FIG. 12 illustrates a method 1200 for managing a tune-away event according to some embodiments. With reference to FIGS. 1-8 and 10-12, the method 1200 may be implemented by a mobile communication device processor (e.g., the general-purpose processor 206, the baseband modem processor 216, or the tune-away management unit 230 of the mobile communication device 200, a separate controller, and/or the like). In blocks 402-424, the processor may perform the operations of like number blocks of the method 400 as described.

In determination block 416, a device processor may determine whether a data loss ratio of the object data is less than (or equal to) a first data loss ratio threshold. In response to determining that the data loss ratio of the object data is not less than (or equal to) the first data loss ratio threshold (i.e., determination block 416="No"), the device processor may determine whether the data loss ratio of the object data is greater than (or equal to) the second data loss ratio threshold in determination block 418.

In response to determining that the data loss ratio of the object data is not greater than (or equal to) the second data loss ratio threshold (i.e., determination block 418="No"), the device processor may determine whether an error rate in data transmission, such as a block error rate (BLER) or average BLER (aBLER), is greater than an a error threshold ($TH_{error}$). The error threshold ($TH_{error}$) may be determined based at least in part on a configurable error coefficient (E) (e.g., a value ranging from 0 to 1), the redundancy level of the object (A), and the factor associated with the FEC coding scheme. For example, the error threshold ($TH_{error}$) may be determined according to the equation:

$$(TH_{error})=E*(1-f_{FEC}/(1+A)).$$

In various embodiments, the error rate may be the BLER determined using a sliding window to monitor the physical multicast channel (PMCH) error rate in the last number (N) MSPs. For example, the number (N) may be equal to the segment duration divided by the MSP. In various embodiments, the error rate may be the aBLER calculated at the end of a current burst for an object (i) based on the PMCH BLER rate of the current burst (BLER(i), where aBLER(i) is determined according to the equation:

$$aBLER(i)=aBLER(i-1)*(1-F)+F*BLER(i),$$

where F is an exponential averaging factor, such as ⅙, stored in a memory of the mobile communication device.

In response to determining that the error rate is greater than the error threshold (i.e., determination block 1202="Yes"), the device processor may permit the tune-away event in block 420, even when the data loss ratio of the object data is greater than (or equal to) TH1 and less than (or equal to) TH2. In response to determining that the error rate is less than or equal to the error threshold (i.e., determination block 1202="No"), the device processor may block the tune-away event in block 422, and the mobile communication device may continue to receive object data using the first RAT.

While FIG. 12 illustrates determination block 1202 following determination blocks 416 and 418, in various embodiments the operations of determinations blocks 1202, 416, and 418 may be performed in any order. For example, the device processor may perform determination block 1202 prior to determination blocks 416 and 418.

Figure 9:
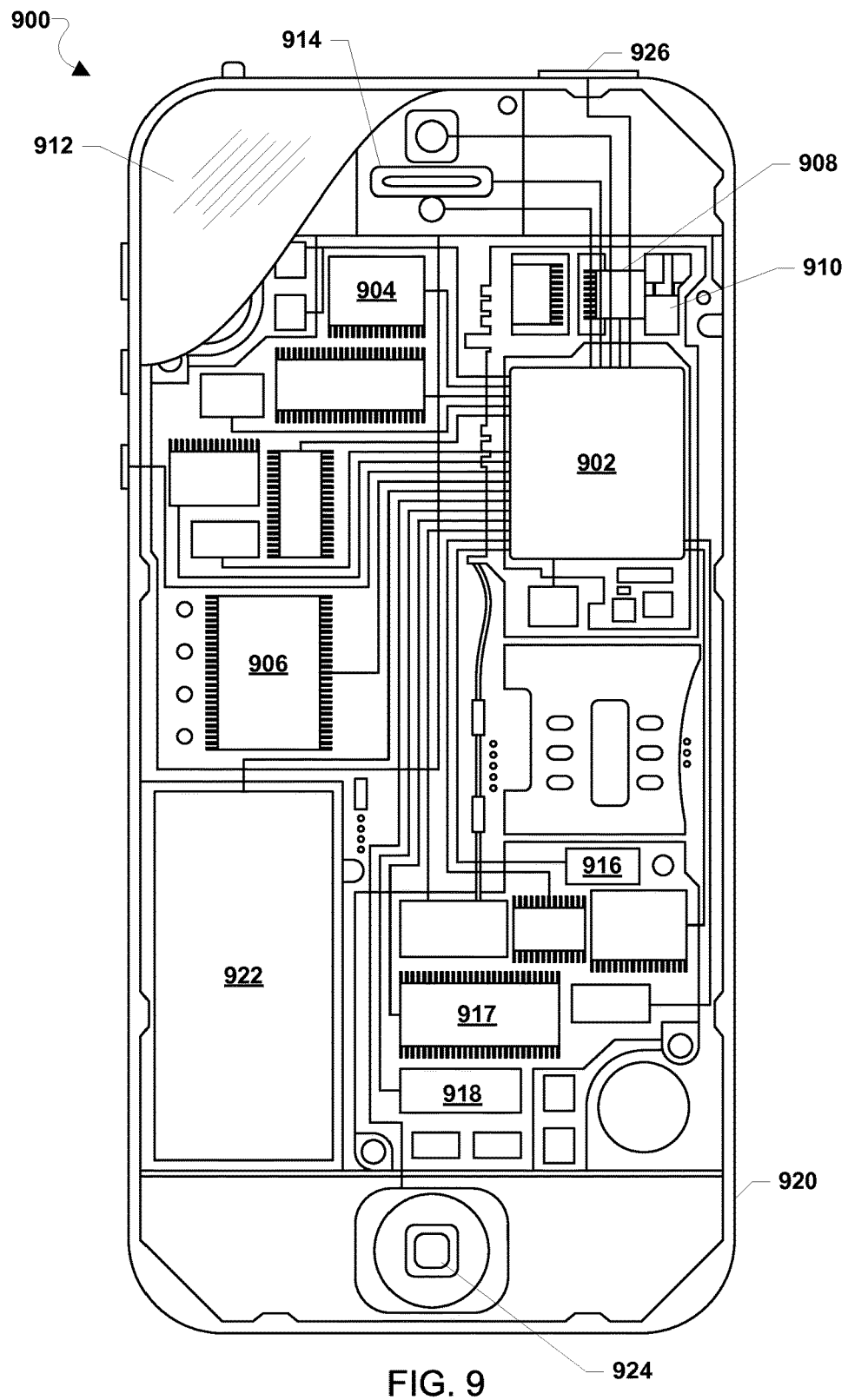
FIG. 9 is a component block diagram of a mobile communication device suitable for implementing various embodiments.

Various embodiments may be implemented in any of a variety of mobile communication devices, an example of which (e.g., mobile communication device 900) is illustrated in FIG. 9. In various embodiments, the mobile communication device 900 may be similar to the wireless devices 110 and 120 as described with reference to FIG. 1 and the mobile communication device 200 as described with reference to FIG. 2. As such, the mobile communication device 900 may implement the methods 400, 500, 600, 700, and/or 800 of FIGS. 4-8 and/or methods 1000, 1100, and/or 1200 of FIGS. 10-12.

The mobile communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile communication device 900 need not have touch screen capability.

The mobile communication device 900 may have two or more radio signal transceivers 908 (e.g., Peanut, Bluetooth, ZigBee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile communication device 900 may include one or more cellular network wireless modem chip(s) 916 coupled to the processor and antennae 910 that enable communication via two or more cellular networks via two or more radio access technologies.

The mobile communication device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

The mobile communication device 900 may also include speakers 714 for providing audio outputs. The mobile communication device 900 may also include a housing 920, constructed of a plastic, metal, or a combination of materials, for containing all or some of the components discussed herein. The mobile communication device 900 may include a power source 922 coupled to the processor 902, such as a disposable or rechargeable battery. The rechargeable battery may also be coupled to the peripheral device connection port to receive a charging current from a source external to the mobile communication device 900. The mobile communication device 900 may also include a physical button 924 for receiving user inputs. The mobile communication device 900 may also include a power button 926 for turning the mobile communication device 900 on and off.

The processor 902 may be any programmable microprocessor, microcomputer or multiple processor chip or chips that can be configured by software instructions (applications) to perform a variety of functions, including the functions of various embodiments described below. In some mobile communication devices, multiple processors 902 may be provided, such as one processor dedicated to wireless communication functions and one processor dedicated to running other applications. Typically, software applications may be stored in the internal memory 906 before they are accessed and loaded into the processor 902. The processor 902 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavy-weight process that includes multiple lightweight processes or threads, which are processes that share all or portions of their context (e.g., address space, stack, permissions and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method implemented on a mobile communication device for managing tune-aways by a radio frequency (RF) resource supporting a first subscription to support a second subscription, comprising:
   determining, by a device processor of the mobile communication device, an amount of data lost in transmission to the mobile communication device via the first subscription; and
   providing, by the device processor to a tune-away management unit in communication with a modem processor, the amount of data lost, wherein the amount of data lost is used by the tune-away management unit to determine whether to block a tune away of the RF resource from the first subscription to the second subscription based on whether the amount of data lost is greater than a first data loss threshold and less than a second data loss threshold.

2. The method of claim 1, wherein the amount of data lost in transmission comprises an amount of object data lost in transmission.

3. The method of claim 1, further comprising determining, by the device processor, an amount of data in an object transmitted to the mobile communication device,
wherein determining the amount of data lost in transmission comprises determining the amount of data lost in transmission based at least in part on the amount of data in the object.

4. The method of claim 3, wherein determining, by the device processor, the amount of data in the object transmitted to the mobile communication device comprises determining, by the device processor, based on a file description table of the object, an amount of data in a File Delivery over Unidirectional Transport (FLUTE) object transmitted to the mobile device.

5. The method of claim 1, wherein the amount of data lost in transmission comprises an amount of object data of a scheduling period lost in transmission.

6. The method of claim 1, wherein providing, by the device processor to a tune-away management unit in communication with a modem processor, the amount of data lost comprises signaling a success or a failure of data reception by a service layer of the mobile communication device to a modem layer of the mobile communication device.

7. The method of claim 6, wherein the service layer comprises a streaming media application of the mobile communication device.

8. The method of claim 1, further comprising determining a data loss ratio based on the amount of data lost in transmission to the mobile communication device via the first subscription.

9. The method of claim 8, further comprising:
comparing the data loss ratio to the first data loss threshold and the second data loss threshold, wherein the first data loss threshold comprises a first data loss ratio threshold and the second data loss threshold comprises a second data loss ratio threshold; and
permitting the tune-away in response to determining that the data loss ratio is less than the first data loss ratio threshold.

10. The method of claim 8, further comprising:
comparing the data loss ratio to the first data loss threshold and the second data loss threshold, wherein the first data loss threshold comprises a first data loss ratio threshold and the second data loss threshold comprises a second data loss ratio threshold; and
permitting the tune-away in response to determining that the data loss ratio is greater than the second data loss ratio threshold.

11. The method of claim 1, further comprising:
providing, by the device processor to the tune-away management unit, an amount of redundant data of a media file transmitted to the mobile communication device; and
determining the first data loss threshold comprising a first data loss ratio threshold based on the amount of redundant data of the media file transmitted to the mobile communication device.

12. The method of claim 11, further comprising determining the second data loss threshold comprising a second data loss ratio threshold based on the first data loss ratio threshold and at least one of a scheduling period for delivering data of the media file to the mobile communication device, a number of streams transmitted by a mobile communication network associated with the first subscription, and an expected duration of the tune-away.

13. A method implemented on a mobile communication device for managing tune-aways by a radio frequency (RF) resource supporting a first subscription to support a second subscription, comprising:
receiving, by a tune-away management unit from a device processor, an amount of data lost in transmission to the mobile communication device via the first subscription;
comparing the amount of data lost to a first data loss threshold and a second data loss threshold; and
blocking, by the tune-away management unit, a tune-away of the RF resource from the first subscription to the second subscription in response to determining that the amount of data lost is greater than the first data loss threshold and less than the second data loss threshold.

14. The method of claim 13, wherein the amount of data lost in transmission comprises an amount of object data lost in transmission.

15. The method of claim 13, wherein the amount of data lost comprises an amount of object data of a scheduling period lost in transmission.

16. The method of claim 13, wherein receiving, by a tune-away management unit from a device processor, an amount of data lost in transmission to the mobile communication device via the first subscription comprises receiving, by a modem layer of the mobile communication device from a service layer of the mobile communication device, a signal of success or failure of data reception.

17. The method of claim 16, wherein the service layer comprises a streaming media application of the mobile communication device.

18. The method of claim 13, further comprising determining a data loss ratio based on the data that is lost in transmission to the mobile communication device via the first subscription.

19. The method of claim 18, further comprising:
comparing the data loss ratio to a first data loss ratio threshold and a second data loss ratio threshold; and
permitting the tune-away in response to determining that the data loss ratio of the data is less than the first data loss ratio threshold.

20. The method of claim 18, further comprising:
comparing the data loss ratio to a first data loss ratio threshold and a second data loss ratio threshold; and
permitting the tune-away in response to determining that the data loss ratio of the data is greater than the second data loss ratio threshold.

21. The method of claim 13, further comprising:
providing, by the device processor to the tune-away management unit, an amount of redundant data of a media file transmitted to the mobile communication device; and
determining a first data loss ratio threshold based on the amount of redundant data of the media file transmitted to the mobile communication device.

22. The method of claim 21, further comprising determining a second data loss ratio threshold based on the first data loss ratio threshold and at least one of a scheduling period for delivering data of the media file to the mobile communication device, a number of streams transmitted by a mobile communication network associated with the first subscription, and an expected duration of the tune-away.

23. A mobile communication device, comprising:
a radio frequency (RF) resource configured to support a first subscription and a second subscription; and
a processor coupled to the RF resource and configured with processor-executable instructions to:
determine an amount of data lost in transmission to the mobile communication device via the first subscription; and
provide to a tune-away management unit in communication with a modem processor the amount of data lost, wherein the amount of data lost is used by the tune-away management unit to determine whether to block a tune away of the RF resource from the first subscription to the second subscription based on whether the amount of data lost is greater than a first data loss threshold and less than a second data loss threshold.

24. The mobile communication device of claim 23, wherein the processor is further configured such that the amount of data lost in transmission comprises an amount of object data lost in transmission.

25. The mobile communication device of claim 23, wherein the processor is further configured to:
determine an amount of data in an object transmitted to the mobile communication device, and
determine the amount of data lost in transmission based at least in part on the amount of data in the object.

26. The mobile communication device of claim 25, wherein the processor is further configured to:
determine based on a file description table of the object, an amount of data in a File Delivery over Unidirectional Transport (FLUTE) object transmitted to the mobile device.

27. The mobile communication device of claim 23, wherein the processor is further configured such that the amount of data lost in transmission comprises an amount of object data of a scheduling period lost in transmission.

28. The mobile communication device of claim 23, wherein the processor is further configured to:
signal a success or a failure of data reception by a service layer of the mobile communication device to a modem layer of the mobile communication device.

29. The mobile communication device of claim 28, wherein the processor is further configured such that the service layer comprises a streaming media application of the mobile communication device.

30. The mobile communication device of claim 23, wherein the processor is further configured to:
determine a data loss ratio based on the amount of data lost in transmission to the mobile communication device via the first subscription.

31. The mobile communication device of claim 30, wherein the processor is further configured to:
compare the data loss ratio to the first data loss threshold and the second data loss threshold, wherein the first data loss threshold comprises a first data loss ratio threshold and the second data loss threshold comprises a second data loss ratio threshold; and
permit the tune-away in response to determining that the data loss ratio is less than the first data loss ratio threshold.

32. The mobile communication device of claim 30, wherein the processor is further configured to:
compare the data loss ratio to the first data loss threshold and the second data loss threshold, wherein the first data loss threshold comprises a first data loss ratio threshold and the second data loss threshold comprises a second data loss ratio threshold; and
permit the tune-away in response to determining that the data loss ratio is greater than the second data loss ratio threshold.

33. The mobile communication device of claim 23, wherein the processor is further configured to:
provide, by the device processor to the tune-away management unit, an amount of redundant data of a media file transmitted to the mobile communication device; and
determine the first data loss threshold comprising a first data loss ratio threshold based on the amount of redundant data of the media file transmitted to the mobile communication device.

34. The mobile communication device of claim 33, wherein the processor is further configured to:
determine the second data loss threshold comprising a second data loss ratio threshold based on the first data loss ratio threshold and at least one of a scheduling period for delivering data of the media file to the mobile communication device, a number of streams transmitted by a mobile communication network associated with the first subscription, and an expected duration of the tune-away.

35. A mobile communication device, comprising:
a radio frequency (RF) resource configured to support a first subscription and a second subscription; and
a processor coupled to the RF resource and configured with processor-executable instructions to:
receive an amount of data lost in transmission to the mobile communication device via the first subscription;
compare the amount of data lost to a first data loss threshold and a second data loss threshold; and
block a tune-away of the RF resource from the first subscription to the second subscription in response to determining that the amount of data lost is greater than the first data loss threshold and less than the second data loss threshold.

36. The mobile communication device of claim 35, wherein the processor is further configured such that the amount of data lost in transmission comprises an amount of object data lost in transmission.

37. The mobile communication device of claim 35, wherein the processor is further configured such that the amount of data lost comprises an amount of object data of a scheduling period lost in transmission.

38. The mobile communication device of claim 35, wherein the processor is further configured to:
receive from a service layer of the mobile communication device a signal of success or failure of data reception.

39. The mobile communication device of claim 38, wherein the processor is further configured such that the service layer comprises a streaming media application of the mobile communication device.

40. The mobile communication device of claim 35, wherein the processor is further configured to:
determine a data loss ratio based on the data that is lost in transmission to the mobile communication device via the first subscription.

41. The mobile communication device of claim 40, wherein the processor is further configured to:
compare the data loss ratio to a first data loss ratio threshold and a second data loss ratio threshold; and
permit the tune-away in response to determining that the data loss ratio of the data is less than the first data loss ratio threshold.

42. The mobile communication device of claim 40, wherein the processor is further configured to:
   compare the data loss ratio to a first data loss ratio threshold and a second data loss ratio threshold; and
   permit the tune-away in response to determining that the data loss ratio of the data is greater than the second data loss ratio threshold.

43. The mobile communication device of claim 35, wherein the processor is further configured to:
   provide, by the device processor to the tune-away management unit, an amount of redundant data of a media file transmitted to the mobile communication device; and
   determine a first data loss ratio threshold based on the amount of redundant data of the media file transmitted to the mobile communication device.

44. The mobile communication device of claim 43, wherein the processor is further configured to:
   determine a second data loss ratio threshold based on the first data loss ratio threshold and at least one of a scheduling period for delivering data of the media file to the mobile communication device, a number of streams transmitted by a mobile communication network associated with the first subscription, and an expected duration of the tune-away.

* * * * *